US011320835B2

(12) United States Patent
Hook et al.

(10) Patent No.: US 11,320,835 B2
(45) Date of Patent: May 3, 2022

(54) MAGNETIC NAVIGATION SYSTEMS FOR AUTONOMOUS MOBILE ROBOTS

(71) Applicant: iRobot Corporation, Bedford, MA (US)

(72) Inventors: Frederic D. Hook, Fontana, CA (US);
Nikolai Romanov, Oak Park, CA (US);
Matthew Mercaldo, Temple, NH (US);
Peter Teulings, Pasadena, CA (US);
Kenneth Holm, Jr., Irvine, CA (US);
Juan Oxoby, West Hollywood, CA (US)

(73) Assignee: iRobot Corporation, Bedford, MA (US)

( * ) Notice: Subject to any disclaimer, the term of this patent is extended or adjusted under 35 U.S.C. 154(b) by 157 days.

(21) Appl. No.: 16/707,840

(22) Filed: Dec. 9, 2019

(65) Prior Publication Data

US 2020/0183413 A1    Jun. 11, 2020

Related U.S. Application Data

(60) Provisional application No. 62/777,808, filed on Dec. 11, 2018.

(51) Int. Cl.
*G05D 1/02* (2020.01)
*B25J 9/16* (2006.01)
*G05D 1/00* (2006.01)

(52) U.S. Cl.
CPC .......... *G05D 1/0261* (2013.01); *B25J 9/1664* (2013.01); *G05D 1/0088* (2013.01); *G05D 1/0225* (2013.01); *G05D 1/0274* (2013.01)

(58) Field of Classification Search
None
See application file for complete search history.

(56) References Cited

U.S. PATENT DOCUMENTS

| 4,737,794 A | 4/1988 | Jones |
| 5,187,664 A | 2/1993 | Yardley et al. |

(Continued)

FOREIGN PATENT DOCUMENTS

| DE | 102018204986 B3 * | 9/2019 | ............. B60L 53/38 |
| EP | 1184684 | 3/2002 | |

(Continued)

OTHER PUBLICATIONS

U.S. Appl. No. 14/512,098, filed Oct. 10, 2014.

(Continued)

*Primary Examiner* — Hunter B Lonsberry
*Assistant Examiner* — Paysun Wu
(74) *Attorney, Agent, or Firm* — Fish & Richardson P.C.

(57) ABSTRACT

An autonomous mobile robot includes a drive system to maneuver the autonomous mobile robot about an environment, a first magnetic field antenna system responsive to a magnetic field pulse to generate a first signal, and a second magnetic field antenna system responsive to the magnetic field pulse to generate a second signal. The magnetic field pulse is emitted by a magnetic field emitter system in the environment. The autonomous mobile robot further includes a controller to execute instructions to perform operations including reorienting the autonomous mobile robot based on the first signal and the second signal.

28 Claims, 17 Drawing Sheets

(56) References Cited

U.S. PATENT DOCUMENTS

| | | | |
|---|---|---|---|
| 8,868,237 B2 | 10/2014 | Sandin et al. | |
| 8,881,339 B2 | 11/2014 | Gilbert et al. | |
| 9,020,637 B2 | 4/2015 | Schnittman | |
| 10,379,172 B2 | 8/2019 | Kleiner et al. | |
| 10,622,846 B2* | 4/2020 | Seong | B60L 53/38 |
| 2002/0188379 A1* | 12/2002 | McGee | B25J 9/1692 |
| | | | 700/245 |
| 2007/0055125 A1 | 3/2007 | Anderson | |
| 2009/0030646 A1 | 1/2009 | Jones | |
| 2009/0287443 A1 | 11/2009 | Jascob et al. | |
| 2009/0292393 A1 | 11/2009 | Casey et al. | |
| 2011/0133726 A1* | 6/2011 | Ballantyne | G01B 7/31 |
| | | | 324/207.11 |
| 2011/0167574 A1 | 7/2011 | Stout et al. | |
| 2012/0029754 A1 | 2/2012 | Thompson | |
| 2013/0296737 A1 | 11/2013 | McMillan et al. | |
| 2014/0253114 A1 | 9/2014 | Khamesee et al. | |
| 2015/0006015 A1 | 1/2015 | Sandin | |
| 2016/0377688 A1 | 12/2016 | Kleiner et al. | |
| 2018/0014709 A1 | 1/2018 | O'Brien et al. | |
| 2020/0212729 A1* | 7/2020 | Smith | H02J 50/90 |
| 2020/0280201 A1* | 9/2020 | Helnerus | B60L 53/31 |
| 2021/0165421 A1* | 6/2021 | Ko | G05D 1/0278 |
| 2021/0257857 A1* | 8/2021 | Braeuchle | B60L 53/38 |

FOREIGN PATENT DOCUMENTS

| | | | | |
|---|---|---|---|---|
| JP | S60 001583 | | 1/1985 | |
| JP | 2002107107 | | 4/2002 | |
| JP | 2005531832 | | 10/2005 | |
| JP | 2011039010 | | 2/2011 | |
| JP | 2013085642 | | 5/2013 | |
| KR | 20030013099 A | * | 2/2003 | ........... G05D 1/0246 |
| KR | 101380996 | | 4/2014 | |
| WO | WO 2016/195744 | | 12/2016 | |

OTHER PUBLICATIONS

International Preliminary Report on Patentability in International Application No. PCT/US2015/061627, dated Dec. 5, 2017, 11 pages.

Raab et al., "Magnetic Position and Orientation Tracking System," IEEE Transactions on Aerospace and Electronic Systems, Sep. 1979, AES-15(5):709-718.

Supplementary European Search Report in European Application No. 15894497.5, dated Jan. 24, 2019, 6 pages.

U.S. Appl. No. 62/059,637, titled "Surface Cleaning Pad," filed Oct. 3, 2014, 72 pages.

International Search Report and Written Opinion in International Appln. No. PCT/US2019/65238, dated May 5, 2020, 12 pages.

PCT Invitation to Pay Additional Fees, and Where Applicable, Protest Fee in International Appln. No, PCT/US2019/65238, dated Feb. 5, 2020, 2 pages.

International Preliminary Report in International Appln. No. PCT/US2019/65238, dated Jun. 24, 2021, 9 pages.

* cited by examiner

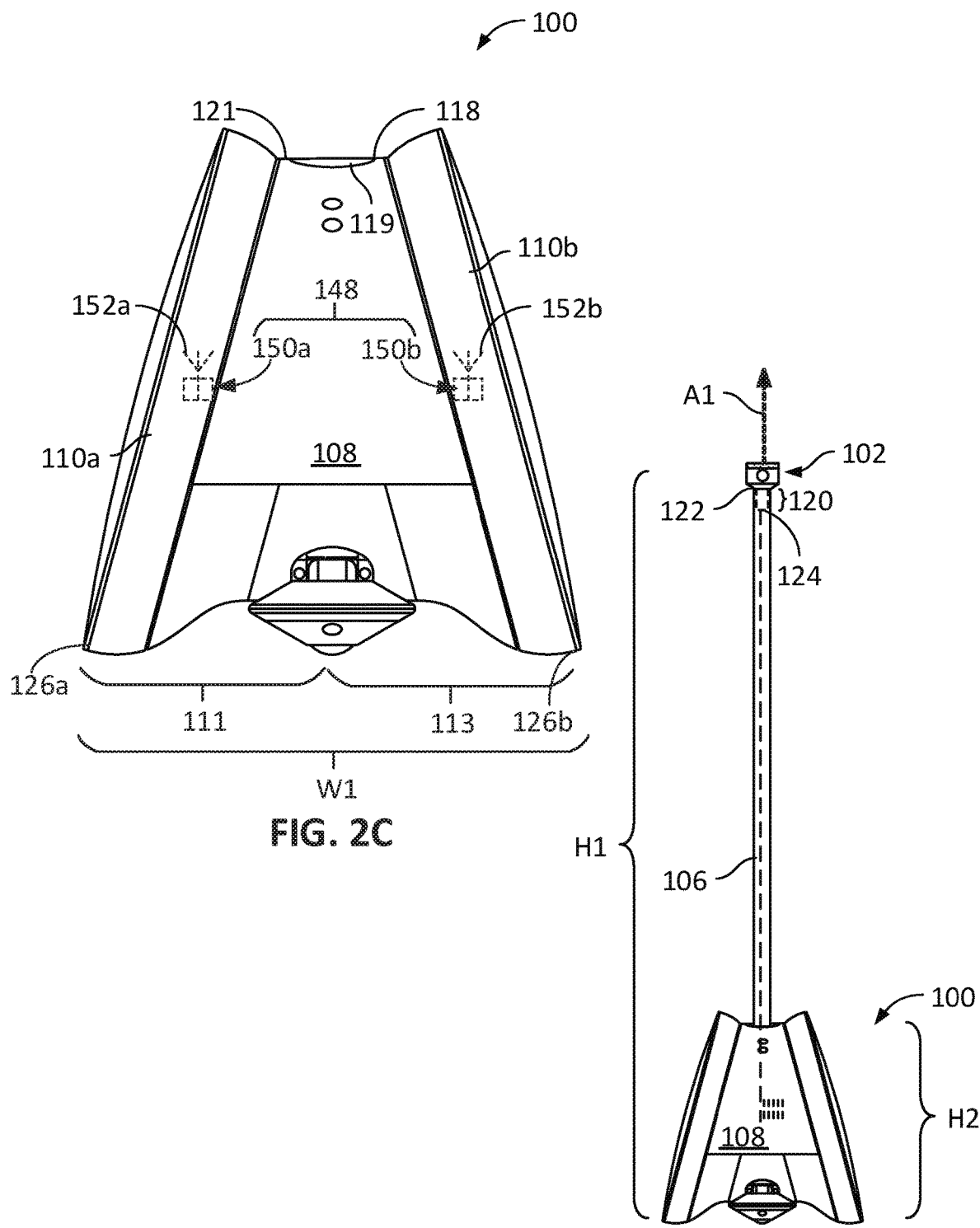

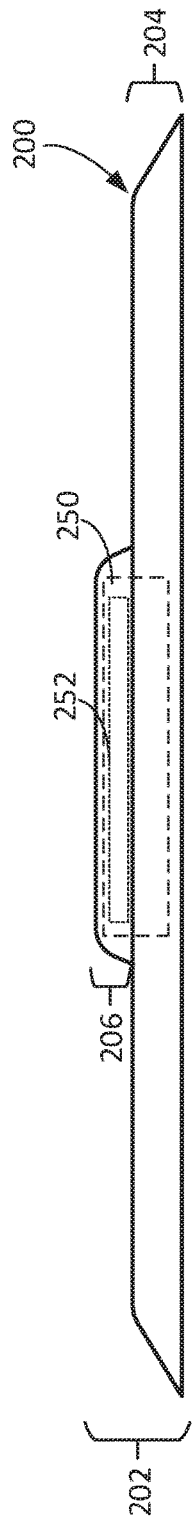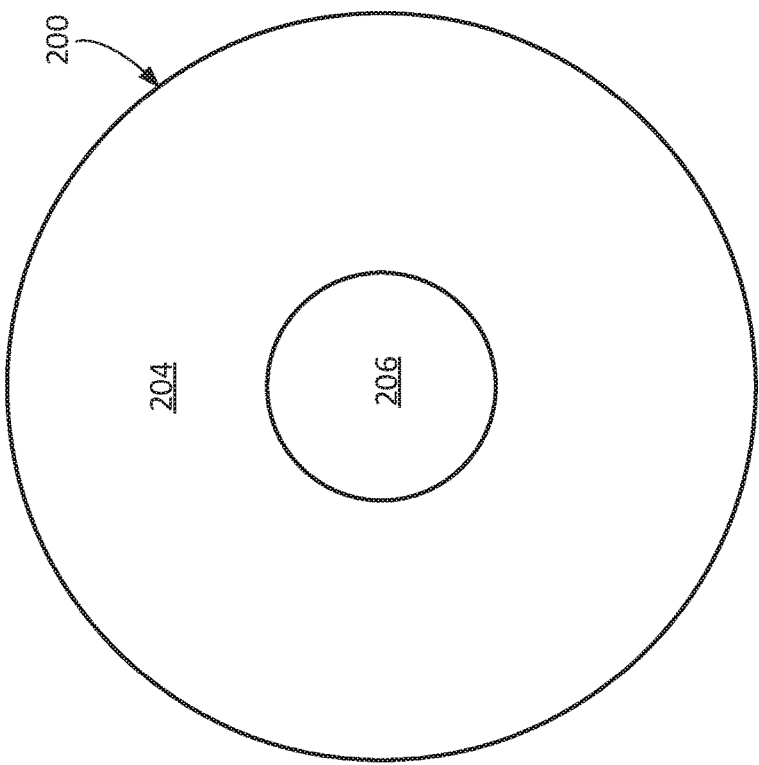
FIG. 3A
FIG. 3B

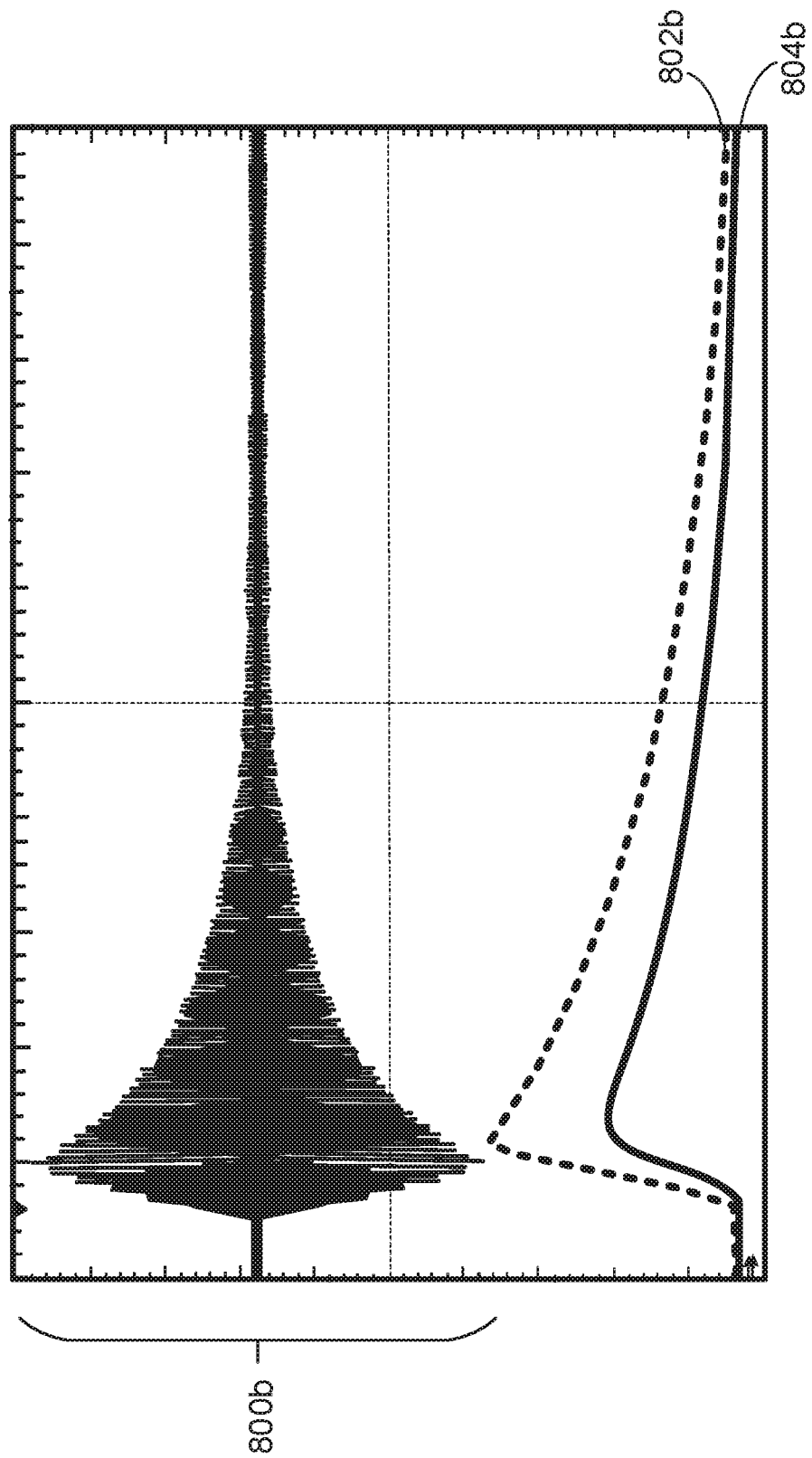

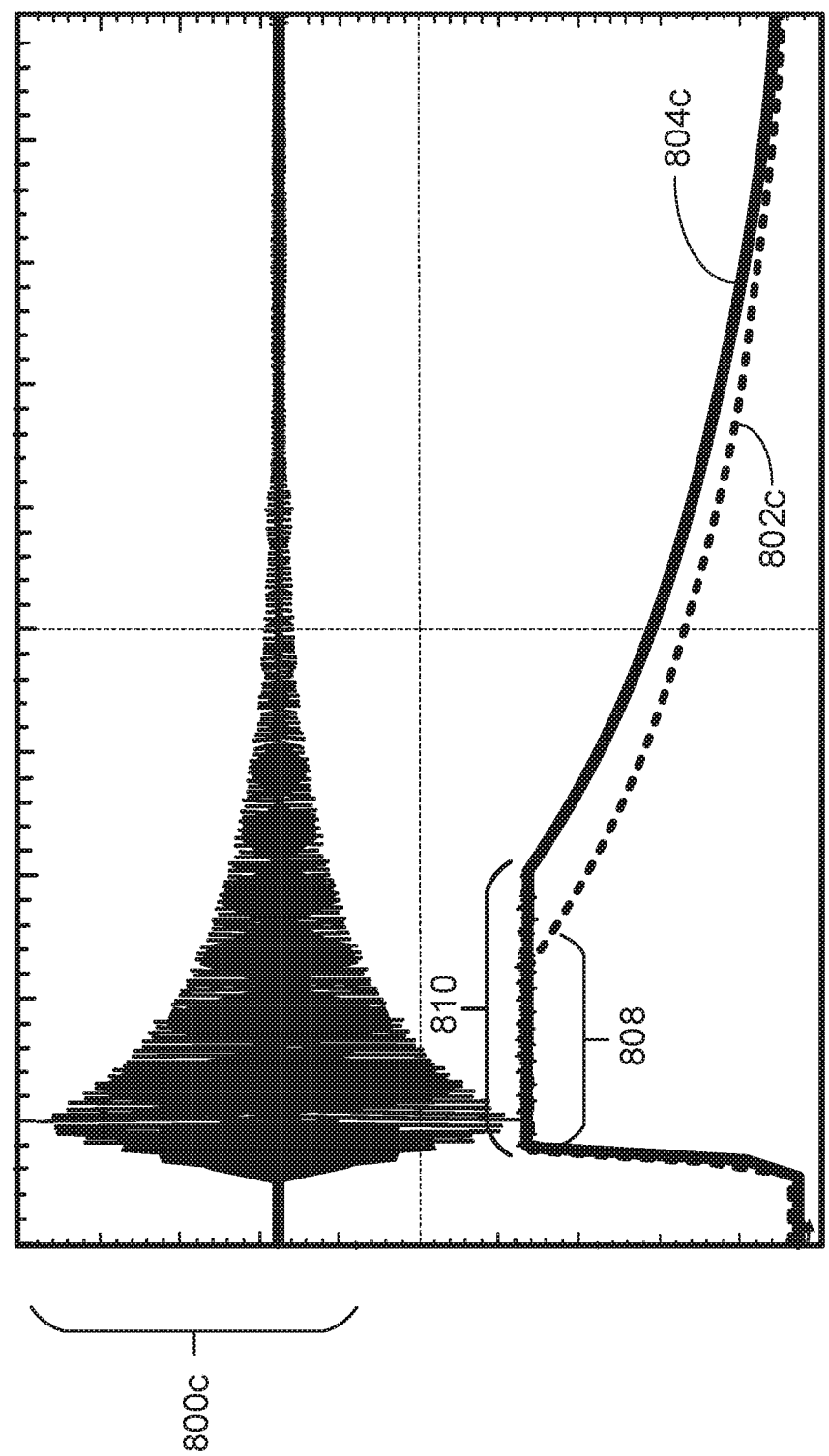

MAGNETIC NAVIGATION SYSTEMS FOR AUTONOMOUS MOBILE ROBOTS

CROSS-REFERENCE TO RELATED APPLICATIONS

This application claims priority to U.S. Provisional Application Ser. No. 62/777,808, filed on Dec. 11, 2018.

TECHNICAL FIELD

This specification relates to magnetic navigation systems, in particular, for autonomous mobile robots.

BACKGROUND

An autonomous mobile robot can navigate about a floor surface in the environment. The robot can perform various tasks in the environment, such as cleaning or patrolling. The robot can include various powered systems, such as a drive system controlled by the robot to propel the robot across the floor surface. The robot can have a battery that supplies energy to the robot to use these powered systems. When the battery of the robot is depleted, the robot can return to a charging station that replenishes the energy stored on the battery.

SUMMARY

An autonomous mobile robot can be charged when the robot is docked to a charging station. The robot can include two magnetic field antennae that respond to magnetic field signals, e.g., pulses, emitted by a charging station. During a docking operation in which the robot moves toward the charging station to dock to the charging station, responses of the antennae may differ from one another and indicate that a forward drive direction of the robot is not aligned with the charging station. When the responses differ from one another, the robot can reorient itself relative to the charging station such that the robot can continue to advance in the forward drive direction toward the charging station during the docking operation.

In one aspect, an autonomous mobile robot is featured. The autonomous mobile robot includes a drive system to maneuver the autonomous mobile robot about an environment, a first magnetic field antenna system responsive to a magnetic field pulse to generate a first signal, and a second magnetic field antenna system responsive to the magnetic field pulse to generate a second signal. The magnetic field pulse is emitted by a magnetic field emitter system in the environment. The autonomous mobile robot further includes a controller to execute instructions to perform operations including reorienting the autonomous mobile robot based on the first signal and the second signal.

In some implementations, the operations can include moving, in a docking operation, the autonomous mobile robot toward a charging station until the autonomous mobile robot is within a distance from the charging station. The operations can include reorienting the autonomous mobile robot based on the first signal and the second signal includes reorienting, in the docking operation, the autonomous mobile robot relative to the charging station in response to the autonomous mobile robot being within the distance from the charging station and based on the first signal and the second signal.

In some implementations, the operations can include after reorienting the autonomous mobile robot relative to the charging station in response to the autonomous mobile robot being within the distance from the charging station, moving the autonomous mobile robot toward the charging station and reorienting the autonomous mobile robot relative to the charging station such that a difference between distances of the first and second magnetic field antenna systems to the magnetic field emitter system decreases.

In some implementations, the autonomous mobile robot can further include a battery configured to be charged at a charging station including the magnetic field emitter system. The operations can include initiating a docking operation to move the autonomous mobile robot to the charging station to charge the battery. Reorienting the autonomous mobile robot can include reorienting the autonomous mobile robot during the docking operation.

In some implementations, reorienting the autonomous mobile robot can include reorienting the autonomous mobile robot in response to determining the first magnetic field antenna system is closer to the charging station than the second magnetic field antenna system is to the charging station.

In some implementations, reorienting the autonomous mobile robot in response to determining the first magnetic field antenna system is closer to the charging station than the second magnetic field antenna system is to the charging station can include reorienting the autonomous mobile robot in response to the first signal and the second signal indicating that the first magnetic field antenna system is closer to the charging station than the second magnetic field antenna system is to the charging station.

In some implementations, a strength of the magnetic field pulse detected at the first magnetic field antenna system can be greater than a strength of the magnetic field pulse at the second magnetic field antenna system.

In some implementations, the first signal generated by the first magnetic field antenna system can include a clipped portion, and the second signal generated by the second magnetic field antenna system can include a clipped portion. A duration of the clipped portion of the first signal can be greater than a duration of the clipped portion of the second signal.

In some implementations, the operations can further include obtaining a first value by extrapolating a declining portion of the first signal, obtaining a second value by extrapolating a declining portion of the second signal, and determining that the first signal and the second signal indicate that the first magnetic field antenna system is closer to the charging station than the second magnetic field antenna system is to the charging station based on the first value being greater than the second value.

In some implementations, the battery can be configured to be charged by a magnetic field emitted by the magnetic field emitter system of the charging station.

In some implementations, initiating the docking operation to move the autonomous mobile robot to the charging station to charge the battery can include initiating the docking operation to move the autonomous mobile robot to a charging position in which the autonomous mobile robot is positioned above at least a portion of the magnetic field emitter system of the charging station.

In some implementations, in the charging position, the autonomous mobile robot can be positioned above an inductive coil of the magnetic field emitter system of the charging station.

In some implementations, the magnetic field emitter system can be a first magnetic field emitter, and the battery can be configured to be charged by a second magnetic field emitter system of the charging station.

In some implementations, the operations can further include moving the autonomous mobile robot in response to determining that the autonomous mobile robot is misaligned with the charging station as the charging station performs a charging operation to charge the battery of the autonomous mobile robot.

In some implementations, the operations can further include as the charging station performs a charging operation to charge the battery of the autonomous mobile robot, periodically communicating with the charging station to indicate a presence of the autonomous mobile robot at the charging station.

In some implementations, the operations can further include as the charging station performs a charging operation to charge the battery of the autonomous mobile robot, communicating with the charging station to indicate a presence of the autonomous mobile robot at the charging station. Communicating with the charging station can include producing a capacitance change detectable by the charging station.

In some implementations, the autonomous mobile robot can include a navigation sensor configured to generate mapping data as the autonomous mobile robot moves about the environment. The operations can include navigating the autonomous mobile robot toward the magnetic field emitter system based on the mapping data, and then navigating, in response to determining that the autonomous mobile robot is within a distance from the magnetic field emitter system, the autonomous mobile robot based on outputs of the first magnetic field antenna system and outputs of the second magnetic field antenna system.

In some implementations, the magnetic field pulse can include a first magnetic field pulse. The first magnetic field antenna system can be responsive to a second magnetic field pulse to generate a third signal. The second magnetic field pulse can be emitted by the magnetic field emitter system. The second magnetic field antenna system can be responsive to the second magnetic field pulse to generate a fourth signal.

In some implementations, reorienting the autonomous mobile robot based on the first signal and the second signal can include moving the autonomous mobile robot in a first direction in response to the first signal and the second signal indicating that the first magnetic field antenna system is closer to a charging station than the second magnetic field antenna system is to the charging station. The charging station can include the magnetic field emitter system, and the operations can further include moving the autonomous mobile robot in a second direction in response to the third signal and the fourth signal indicating that the second magnetic field antenna system is closer to the charging station than the first magnetic field antenna system is to the charging station.

In some implementations, the first magnetic field antenna system can be positioned on a first lateral half of the autonomous mobile robot, and the second magnetic field antenna system can be positioned on a second lateral half of the autonomous mobile robot.

In some implementations, the drive system can further include a first drive wheel and a second drive wheel operable to move the autonomous mobile robot about the environment. The first magnetic field antenna system can be adjacent to the first drive wheel, and the second magnetic field antenna system can be adjacent to the second drive wheel.

In some implementations, a distance between the first magnetic field antenna system and a rightmost edge of the autonomous mobile robot can be no more than 5% to 15% of an overall width of the autonomous mobile robot, and a distance between the second magnetic field antenna system and a leftmost edge of the autonomous mobile robot can be no more than 5% to 15% of the overall width of the autonomous mobile robot.

In some implementations, the first magnetic field antenna system can include a first inductive coil responsive to the magnetic field pulse, and the second magnetic field antenna system can include a second inductive coil responsive to the magnetic field pulse.

In another aspect, a charging station for an autonomous mobile robot is featured. The charging station includes a housing, a magnetic field emitter system supported by the housing, and a controller operably connected to the magnetic field emitter system. The controller is configured to execute instructions to perform operations. The operations include operating the magnetic field emitter system to emit magnetic field pulses to guide the autonomous mobile robot to a docking position above at least a portion of the magnetic field emitter system, and operating the magnetic field emitter system to charge a battery of the autonomous mobile robot.

In some implementations, operating the magnetic field emitter system to emit the magnetic field pulses can include initiating emission of a series of magnetic field pulses, in which a pulse repetition period to emit the series of magnetic field pulses is between 100 and 300 milliseconds.

In some implementations, the charging station can further include a current sensor configured to detect a metallic object proximate to the magnetic field emitter system.

In some implementations, the current sensor can be configured to detect a resonant capacitance change produced by the autonomous mobile robot. The resonant capacitance change can be indicative of the autonomous mobile robot being in the docking position.

In some implementations, the magnetic field emitter system can include a first magnetic field emitter and a second magnetic field emitter. Operating the magnetic field emitter system to emit the magnetic field pulses to guide the autonomous mobile robot to the docking position above at least the portion of the magnetic field emitter system can include operating the first magnetic field emitter to emit the magnetic field pulses to guide the autonomous mobile robot to a docking position above at least the portion of the magnetic field emitter system. Operating the magnetic field emitter system to charge the battery of the autonomous mobile robot can include operating the second magnetic field emitter to charge the battery of the autonomous mobile robot.

In another aspect, a method is featured. The method includes generating, by a first magnetic field antenna system of an autonomous mobile robot, a first signal in response to detecting a magnetic field pulse emitted by a magnetic field emitter system in an environment; generating, by a second magnetic field antenna system of the autonomous mobile robot, a second signal in response to detecting the magnetic field pulse; and reorienting the autonomous mobile robot based on the first signal and the second signal.

In some implementations, the method can further include moving, in a docking operation, the autonomous mobile robot toward a charging station until the autonomous mobile robot is within a distance from the charging station, and reorienting the autonomous mobile robot based on the first signal and the second signal can include reorienting, in the docking operation, the autonomous mobile robot relative to the charging station in response to the autonomous mobile robot being within the distance from the charging station and based on the first signal and the second signal.

In some implementations, the method can further include after reorienting the autonomous mobile robot relative to the charging station in response to the autonomous mobile robot being within the distance from the charging station, moving the autonomous mobile robot toward the charging station and reorienting the autonomous mobile robot relative to the charging station such that a difference between a value of the first signal and a value of the second signal decreases.

In some implementations, the method can further include initiating a docking operation to move the autonomous mobile robot to a charging station to charge a battery of the autonomous mobile robot. Reorienting the autonomous mobile robot can include reorienting the autonomous mobile robot during the docking operation.

In some implementations, reorienting the autonomous mobile robot can include reorienting the autonomous mobile robot in response to determining the first magnetic field antenna system is closer to the charging station than the second magnetic field antenna system is to the charging station.

In some implementations, reorienting the autonomous mobile robot in response to determining the first magnetic field antenna system is closer to the charging station than the second magnetic field antenna system is to the charging station can include reorienting the autonomous mobile robot in response to the first signal and the second signal indicating that the first magnetic field antenna system is closer to the charging station than the second magnetic field antenna system is to the charging station.

In some implementations, a strength of the magnetic field pulse detected at the first magnetic field antenna system can be greater than a strength of the magnetic field pulse at the second magnetic field antenna system.

In some implementations, the first signal generated by the first magnetic field antenna system can include a clipped portion, and the second signal generated by the second magnetic field antenna system can include a clipped portion. A duration of the clipped portion of the first signal can be greater than a duration of the clipped portion of the second signal.

In some implementations, the method can include obtaining a first value by extrapolating a declining portion of the first signal, obtaining a second value by extrapolating a declining portion of the second signal, and determining that the first signal and the second signal indicate that the first magnetic field antenna system is closer to the charging station than the second magnetic field antenna system is to the charging station based on the first value being greater than the second value.

In some implementations, the method can include docking the autonomous mobile robot to the charging station such that the battery of the autonomous mobile robot is charged by a magnetic field emitted by the magnetic field emitter system of the charging station.

In some implementations, initiating the docking operation to move the autonomous mobile robot to the charging station to charge the battery can include initiating the docking operation to move the autonomous mobile robot to a charging position in which the autonomous mobile robot is positioned above at least a portion of the magnetic field emitter system of the charging station.

In some implementations, in the charging position, the autonomous mobile robot can be positioned above an inductive coil of the magnetic field emitter system of the charging station.

In some implementations, the magnetic field emitter system can be a first magnetic field emitter, and the method can further include docking the autonomous mobile robot to the charging station such that the battery of the autonomous mobile robot is charged by a second magnetic field emitter system of the charging station.

In some implementations, the method can include moving the autonomous mobile robot in response to determining that the autonomous mobile robot is misaligned with the charging station as the charging station performs a charging operation to charge the battery of the autonomous mobile robot.

In some implementations, the method can further include as the charging station performs a charging operation to charge the battery of the autonomous mobile robot, periodically communicating with the charging station to indicate a presence of the autonomous mobile robot at the charging station.

In some implementations, the method can further include as the charging station performs a charging operation to charge the battery of the autonomous mobile robot, communicating with the charging station to indicate a presence of the autonomous mobile robot at the charging station. Communicating with the charging station can include producing a resonant capacitance change detectable by the charging station.

In some implementations, the method can further include navigating the autonomous mobile robot toward the magnetic field emitter system based on mapping data produced by the autonomous mobile robot, and then navigating, in response to determining that the autonomous mobile robot is within a distance from the magnetic field emitter system, the autonomous mobile robot based on outputs of the first magnetic field antenna system and outputs of the second magnetic field antenna system.

In some implementations, the magnetic field pulse can include a first magnetic field pulse. The first magnetic field antenna system can be responsive to a second magnetic field pulse to generate a third signal. The second magnetic field pulse can be emitted by the magnetic field emitter system. The second magnetic field antenna system can be responsive to the second magnetic field pulse to generate a fourth signal.

In some implementations, reorienting the autonomous mobile robot based on the first signal and the second signal can include moving the autonomous mobile robot in a first direction in response to the first signal and the second signal indicating that the first magnetic field antenna system is closer to a charging station than the second magnetic field antenna system is to the charging station. The charging station can include the magnetic field emitter system. The method can further include moving the autonomous mobile robot in a second direction in response to the third signal and the fourth signal indicating that the second magnetic field antenna system is closer to the charging station than the first magnetic field antenna system is to the charging station.

In some implementations, the first magnetic field antenna system can be positioned on a first lateral half of the autonomous mobile robot, and the second magnetic field antenna system can be positioned on a second lateral half of the autonomous mobile robot.

In some implementations, a distance between the first magnetic field antenna system and a rightmost edge of the autonomous mobile robot can be no more than 5% to 15% of an overall width of the autonomous mobile robot. A distance between the second magnetic field antenna system and a leftmost edge of the autonomous mobile robot can be no more than 5% to 15% of the overall width of the autonomous mobile robot.

In some implementations, the first magnetic field antenna system can include a first inductive coil responsive to the magnetic field pulse, and the second magnetic field antenna system can include a second inductive coil responsive to the magnetic field pulse.

Advantages of the foregoing may include, but are not limited to, those described below and herein elsewhere.

In some implementations, an autonomous mobile robot can use magnetic field pulses emitted by a magnetic field emitter system into an environment to precisely move towards the magnetic field emitter system. In particular, the magnetic field pulses allow the robot to easily align with the magnetic field emitter system. In implementations in which the magnetic field emitter system is part of a charging station for the robot, the charging station can emit the magnetic field pulses to precisely direct the robot to a docking position above the charging station to facilitate charging of the robot.

In some implementations, an autonomous mobile robot can detect the magnetic field pulses emitted by the magnetic field emitter system using low-cost magnetic field antenna systems. The magnetic field antenna systems can be capable of detecting magnetic fields along a single axis and do not need to detect magnetic fields along multiple axes. The costs of these magnetic field antenna systems can thus be low compared to magnetic field antenna systems that detect magnetic fields along multiple axes. Also, instead of relying on high-resolution magnetic field antenna systems that could be costly, the robot can use its controller to operate the magnetic field antenna systems to allow these systems to detect magnetic fields for a large range of field amplitudes. For example, the controller can adjust gains of the magnetic field antenna systems as the robot moves about the environment to increase the range of field amplitudes detectable by the magnetic field antenna systems.

In some implementations, the magnetic field emitter system can be used for multiple purposes, thus decreasing the number of components necessary to guide the robot, charge the robot, and detect foreign objects near the magnetic field emitter system. The magnetic field emitter system can, for example, emit pulses of magnetic fields using an inductive coil, and these pulses can be used to guide the robot to the magnetic field emitter system. This same inductive coil can be used to emit pulses of magnetic fields to charge the robot. In implementations in which the magnetic field emitter system is on a charging station, the charging station need not have both an inductive coil for emitting magnetic field pulses to guide the robot toward the charging station and a separate inductive coil for emitting magnetic field pulses to charge the robot. Furthermore, the magnetic field emitter system can also emit magnetic field pulses to detect foreign objects proximate to the magnetic field emitter system.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 2A-2C are front perspective, bottom, and front views of an example of an autonomous mobile robot.

FIG. 2D is a rear view of the autonomous mobile robot of FIG. 2A with an image capture device of the autonomous mobile robot in an extended position.

FIGS. 3A and 3B are a front view and a top view, respectively, of a charging station.

FIGS. 8A-8D illustrate waveforms of electrical signals transmitted through a magnetic field emitter system and waveforms generated by magnetic field antenna systems during the process of FIG. 6A.

Like reference numbers and designations in the various drawings indicate like elements.

DETAILED DESCRIPTION

Figure 1:
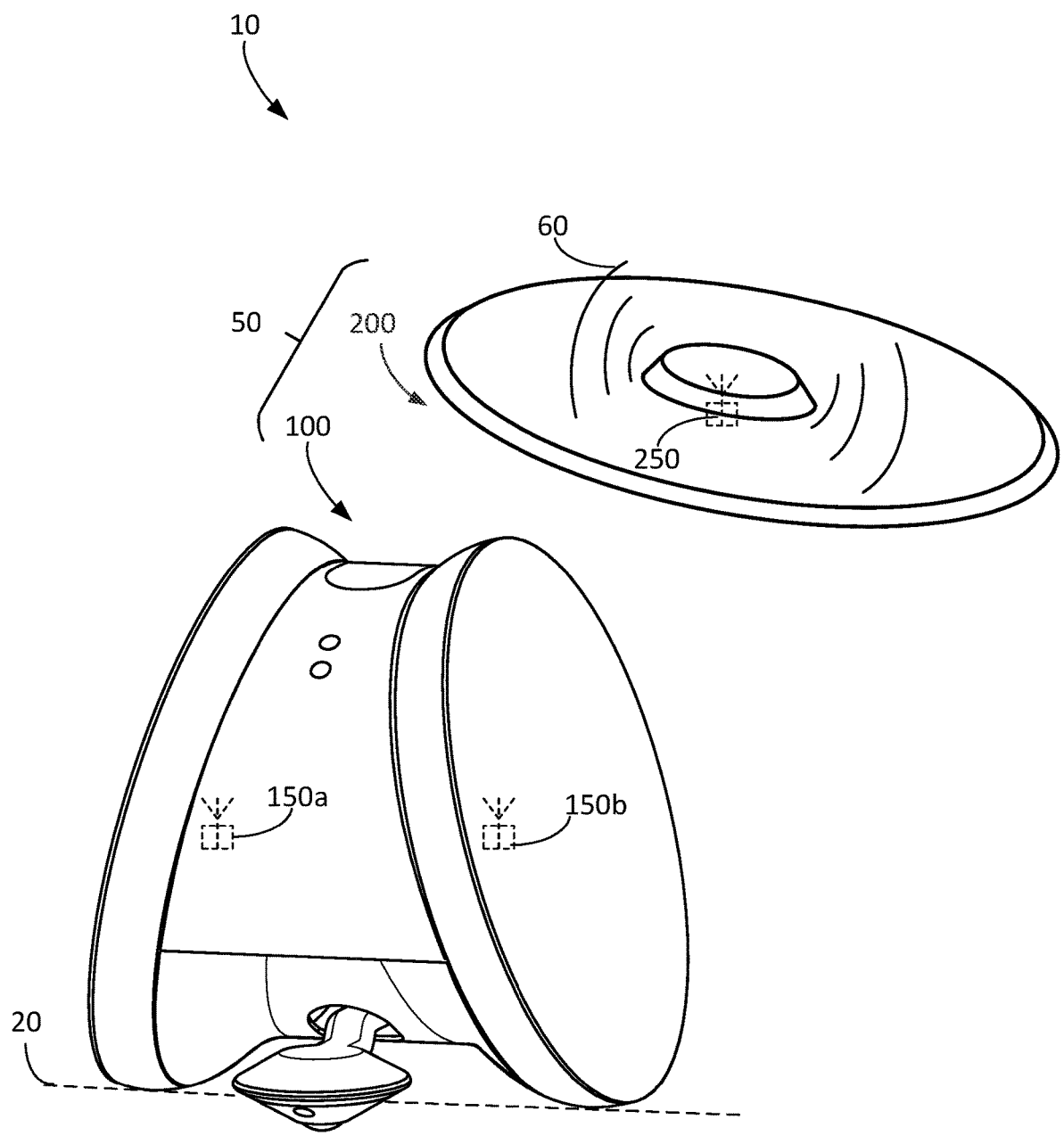
FIG. 1 is a perspective view of a charging system including an autonomous mobile robot and a charging station.

Referring to FIG. 1, a charging system 50 in an environment 10 includes an autonomous mobile robot 100 and a charging station 200. The robot 100 is on a floor surface 20 in the environment 10, and is positioned away from the charging station 200. During a docking operation, the robot 100 can move toward the charging station 200 and then dock to the charging station 200 to allow the charging station 200 to charge a battery, multiple batteries, other types of electrical charge devices, etc., (not shown) of the robot 100. The charging station 200 can include a magnetic field emitter system 250 that emits pulses 60 detectable by magnetic field antenna systems 150a, 150b of the robot 100. These pulses 60 can guide the robot 100 toward the charging station 200. As discussed herein, the robot 100 detects the pulses 60, the robot 100 can reorient itself relative to the charging station 200 such that the robot 100 can continue to advance in a forward drive direction toward the charging station 200. Once the robot 100 is in a docking position, the charging station 200 can emit energy, e.g., magnetic field pulses, electromagnetic signals, etc., that charge the robot 100.

Example Autonomous Mobile Robots and Charging Stations

Autonomous mobile robots for monitoring systems can include image capture devices for generating digital imagery of environments of the robots. FIGS. 2A-2D illustrate an example of the robot 100. The robot 100 can be a patrol robot that maneuvers about the environment 10 and capture digital imagery that can be presented to a user, for example, through a user computing device such as a laptop computer, a desktop computer, a smartphone, an augmented reality display device, a virtual reality display device, a tablet computer, or other electronic computing device. The robot 100 can autonomously travel through the environment 10 to capture the digital imagery. In some implementations, the robot 100 can travel through user-selected waypoints, while in other implementations, the robot 100 can travel through the environment 10 autonomously and then initiate the docking operation in response to a charge level of a battery of the robot 100 being no more than a threshold level, e.g., a low battery threshold level. The robot 100 can initiate the docking operation so that the robot 100 can be charged by the charging station 200.

Figure 2A:
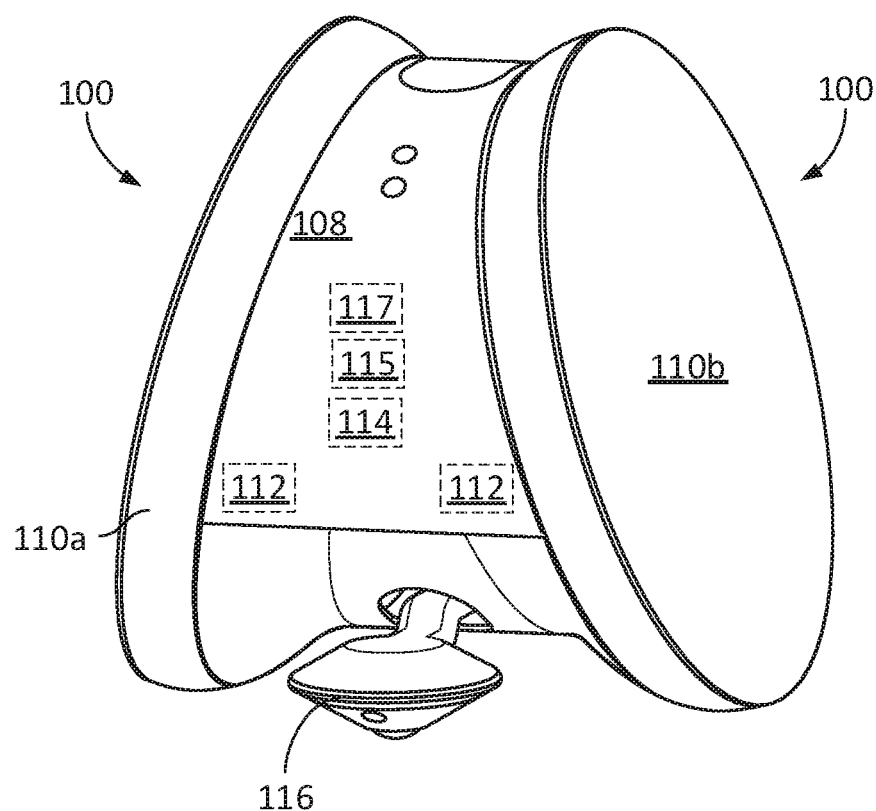

Referring to FIG. 2A, the robot 100 includes a drive system that is operable to maneuver the robot 100 about a floor surface. The drive system of the robot 100 includes any suitable mechanism or system for actively and controllably causing the robot 100 to maneuver through the environment 10. For example, the drive system includes drive wheels 110a, 110b that support the body 108 of the robot 100 above the floor surface 20 and one or more motors 112 (represented by dashed lined boxes to indicate their locations within the body 108) engaged to the drive wheels 110a, 110b. The drive wheels 110a, 110b are rotatably driven by the one or more motors 112. The one or more motors 112 are controllable by a controller 114 (represented by a dashed line box to indicate its location within the body 108) of the robot 100. The controller 114 can execute instructions to perform operations, such as reorienting the robot 100 relative to a charging station as described herein. In some implementations, the one or more motors 112 includes two distinct motors, with one motor being operable to control rotation of the drive wheel 110a, another motor being operable to control rotation of the drive wheel 110b.

The robot 100 has a substantially trapezoidal profile for added stability as the robot 100 transits along the floor surface 20. An overall width W1 (shown in FIG. 2B) of the robot 100 can be between 20 and 80 centimeters, e.g., between 20 and 50 centimeters, 30 and 60 centimeters, 40 and 70 centimeters, and 50 and 80 centimeters. The body 108 houses electromechanical systems of the robot 100, including the one or more motors 112, the controller 114, and other systems enabling autonomous function of the robot 100. In some implementations, the electromechanical systems include a power system, a sensor system, or both. As shown in FIG. 2A, the power system includes a battery 115 (represented by a dashed line box to indicate its location within the body 108) and a battery charging device 117 (represented by a dashed line box to indicate its location within the body 108) configured to allow the battery 115 to be charged by a charging station when the robot 100 is docked at the charging station. In this regard, the robot 100 is capable of operating with energy stored in the battery 115 to move about the environment 10, capture digital imagery, and otherwise perform operations. Furthermore, as described herein, the robot 100 is chargeable by the charging station. The battery charging device 117 can include an inductive coil that is responsive to magnetic fields in the environment 10 and that produces a current in response to these magnetic fields. This current can be used to charge the battery 115.

The sensor system includes an image sensor of the image capture device 102. In some examples, the image capture device 102 includes the image sensor, a housing for the image sensor, a lens to transmit received light from the environment 10 to the image sensor, and other components enabling operation of the image sensor for image capture.

The sensor system also includes sensors (e.g., navigation sensors) usable by the controller 114 to navigate about the environment 10. The navigation sensors generate signals for estimating a position of the robot 100 within the environment 10, for detecting objects and obstacles within the environment 10, and for generating a robot map, e.g., an occupancy map of the environment 10. For example, in implementations in which the navigation sensors generate signals for generating the robot map, the navigation sensors can produce mapping data usable by the robot 100 form a map of the environment 10. These navigation sensors include, for example, dead reckoning sensors, obstacle detection and avoidance (ODOA) sensors, simultaneous localization and mapping (SLAM) sensors, etc. The navigation sensors include, in some cases, the image sensor of the image capture device 102 for visual identification of features and landmarks used in calculating robot pose on the robot map. The navigation sensors alternatively or additionally include proximity sensors, contact sensors, motion sensors, cliff sensors, or a combination thereof. The sensor system can further include sensors for monitoring the flexible member 106, e.g., for determining a position of the flexible member 106 relative to the body 108 of the robot 100.

In some implementations, the robot 100 further includes a rear stability wheel 116, e.g., a caster wheel, that extends rearward from the body 108 and cooperates with the drive wheels 110a, 110b to support the body 108 above the floor surface 20. In some cases, the stability wheel 116 is movable relative to the body 108, and the robot 100 includes a motor operably connected to the stability wheel 116 to move the stability wheel 116 relative to the body 108. The stability wheel 116 is movable into an interior of the robot 100.

Figure 2B:
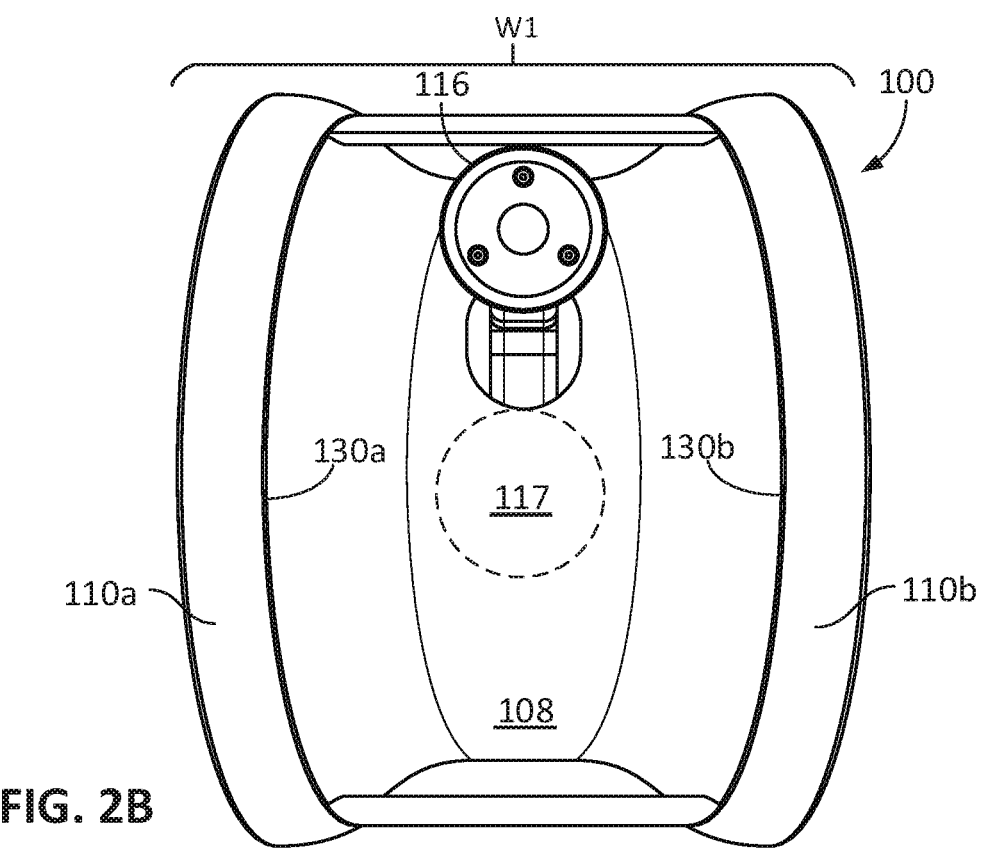

Referring to FIG. 2B, which shows a bottom view of the robot 100, a footprint of the robot 100 on the floor surface 20 is defined by exterior components of the robot 100, such as the body 108 and the drive wheels 110a, 110b. In some examples, the area of the footprint is less than 0.5 square meters, e.g., less than 0.1 square meters, less than 0.3 square meters, less than 0.05 square meters. The smaller area footprint can enable the robot 100 to be easily stored when it is not being operated and to more easily transit between rooms of an environment. If the environment is cluttered, e.g., having many obstacles and having relatively small traversable areas, the smaller area footprint of the robot 100 can enable the robot 100 to maneuver between and around the obstacles without contacting the obstacles.

Referring to FIGS. 2C and 2D, the body 108 includes an opening 118 through which the image capture device 102 and the flexible member 106 extend from within the body 108 to outside of the body 108 or retract from outside of the body 108 to within the body 108. A distal portion 120 of the flexible member 106, e.g., a distal end of the flexible member 106, is coupled to the image capture device 102 such that movement of the distal portion 120 causes movement of the image capture device 102. For example, the flexible member 106 is attached to a housing 122 of the image capture device 102. The housing 122 is a rigid structure, e.g., formed from a metal such as aluminum or steel or formed from a rigid polymer such as a polycarbonate, acrylonitrile butadiene styrene, or nylon, that supports the image capture device 102. The distal portion 120 of the flexible member 106 is wrapped around an outer surface of a bottom portion 124 of the housing 122 to attach the flexible member 106 to the housing 122.

FIG. 2C illustrates the robot 100 with the image capture device 102 and the flexible member 106 are in fully retracted positions. When the flexible member 106 and the image capture device 102 are in the fully retracted positions, a top surface 119 of the image capture device 102 is substantially flush or entirely flush with a top surface 121 of the body 108. For example, the image capture device 102 is positioned between 0 and 1 cm from the top surface 121 of the body 108, e.g., between 0 and 0.3 cm, 0.3 cm and 0.7 cm, or 0.7 cm and 1 cm from the top surface 121 of the body 108, when the image capture device 102 is in the fully retracted position. In addition, in the fully retracted position of the flexible member 106, an image sensor of the image capture device 102 is positioned within the body 108 such that the image sensor cannot capture digital imagery of the environment 10. The image capture device 102 can be placed into the fully retracted position, for example, to provide privacy for human occupants of the environment 10. In some examples, the image capture device 102 can be placed into the fully retracted position to protect the image capture device 102 as the robot 100 traverses the environment 10 or when the robot 100 is stored. In addition, the robot 100 has a more compact profile when the image capture device 102 is fully retracted, thereby enabling the robot 100 to be more easily stored.

As shown in FIG. 2C, the robot 100 includes a signal detection system such as a magnetic field detection system 148 that detects magnetic fields in the environment 10. The magnetic field detection system 148 can include the magnetic field antenna system 150a and the magnetic field antenna system 150b. The magnetic field antenna system 150a and the magnetic field antenna system 150b can include a magnetic antenna 152a and a magnetic antenna 152b, respectively, responsive to magnetic fields in the environment 10. As described herein, the magnetic antenna 152a and the magnetic antenna 152b can be inductive coils that respond to magnetic field pulses in the environment 10 by generating electrical signals (e.g., current signals).

The magnetic field antenna systems 150a, 150b can be spaced apart from one another in a lateral direction, e.g., a horizontal direction perpendicular to a forward drive direction of the robot 100. The magnetic field antenna system 150a can be a left magnetic field antenna system 150a, and the magnetic field antenna system 150b can be a right magnetic field antenna system. The magnetic field antenna system 150a can be positioned on a left lateral half 111 of the robot 100, and the magnetic field antenna system 150b can be positioned on a right lateral half 113 of the robot 100. The magnetic field antenna system 150a of the magnetic field antenna system 150a can be positioned adjacent to and near the drive wheel 110a, e.g., a left drive wheel of the robot 100, and the magnetic field antenna system 150b of the magnetic field antenna system 150b can be positioned adjacent to or near the drive wheel 110b, e.g., a right drive wheel of the robot 100. In some implementations, the magnetic field antenna systems 150a, 150b are positioned between 0.5 and 15 centimeters, e.g., between 0.5 and 10 centimeters, 1 and 5 centimeters, 2 and 8 centimeters, 3 and 10 centimeters, or 5 and 15 centimeters, from the drive wheels 110a, 110b, respectively. In some implementations, the magnetic field antenna systems 150a, 150b are near a rightmost edge and a leftmost edge, respectively. For example, a distance between the magnetic field antenna system 150a and a rightmost edge 126a of the robot 100 and a distance between the magnetic field antenna system 150b and a leftmost edge 126b of the robot 100 can be no more than 5% to 20% of the overall width W1 of the robot 100, e.g., no more than 5% to 10%, 5% to 15%, 10% to 15%, 10% to 20%, or 15% to 20% of the overall width W1 of the robot 100.

The magnetic field antenna system 150a, 150b can have responses to a magnetic field in the environment 10 that differ from one another. For example, the magnetic field antenna system 150a can be responsive to a magnetic field pulse to generate a first signal, and the magnetic field antenna system 150b can be responsive to the magnetic field pulse to generate a second signal. The first and second signals can be electrical signals. A characteristic of the first signal can differ from a characteristic of the second signal. In some implementations, the characteristics can be a current of the first signal and a current of the second signal. In some implementations, other characteristics may be employed individually, in combination, in combination with the mentioned current characteristics, etc. For example, amplitude, phase, frequency, polarization, etc. characteristics of the first and second signals may be used. In some implementations, information provided from one or more modulations, encoding, etc. may be used for characteristics of the first and second signals. As described herein, the characteristics of the first and second signals can be used to guide the robot 100 toward a charging station.

FIG. 2D illustrates the robot 100 when the image capture device 102 and the flexible member 106 are in fully protracted positions. The flexible member 106 and the image capture device 102 are movable along a longitudinal axis A1, e.g., a vertical axis extending through the opening 118 from which the flexible member 106 is protracted. In some examples, a maximum height H1 of the flexible member 106 above the floor surface (shown in FIG. 2D) is between 0.5 and 2.5 meters, e.g., between 0.5 and 1.5 meters, 1.0 and 2.0 meters, or 1.5 and 2.5 meters. The maximum height H1 of the flexible member 106 corresponds to the maximum height of the image capture device 102 in the fully protracted position. The body 108 of the robot 100 has a height H2 above the floor surface between 0.15 and 0.5 meters, e.g., between 0.15 and 0.3 meters, 0.15 and 0.4 meters, or 0.15 and 0.35 meters. The height H2 corresponds to the height of the image capture device 102 in the fully retracted position. The height H2 of the body 108 is between 10 and 40% of the maximum height H1 of the flexible member 106, e.g., between 10 and 30%, 15 and 35%, or 20 and 40% of the maximum height H1.

FIGS. 3A and 3B illustrate an example of the charging station 200. The charging station 200 includes a housing 202 including a base 204 and a raised portion 206. The charging station 200 further includes the magnetic field emitter system 250. The magnetic field emitter system 250 is supported by the housing 202.

At least a portion of the magnetic field emitter system 250 can be housed within the raised portion 206 of the charging station 200. For example, an inductive coil of the magnetic field emitter system 250 can be positioned within the raised portion 206. The raised portion 206 can be aligned with the battery charging device 117 (shown in FIG. 2A) of the robot 100 when the robot 100 is in the docking position such that the magnetic field emitted by the magnetic field emitter system 250 can induce the electrical current in the battery charging device 117, thereby charging the battery 115 (shown in FIG. 2A) of the robot 100.

The base 204 can support the charging station 200 on the floor surface 20 (shown in FIG. 1). In addition, the base 204 can provide a platform to support the robot 100 above the floor surface 20 when the robot 100 is in the docking position above the charging station 200. For example, when the robot 100 is in the docking position, the drive wheels 110a, 110b can be supported on the base 204.

In the example depicted in FIG. 3B, the charging station 200 can have a circular perimeter, and the raised portion 206 is positioned at the center of the charging station 200. Thus, the robot 100 can be aligned with the center of the charging station 200 when the robot 100 is in the docking position.

Figure 4:
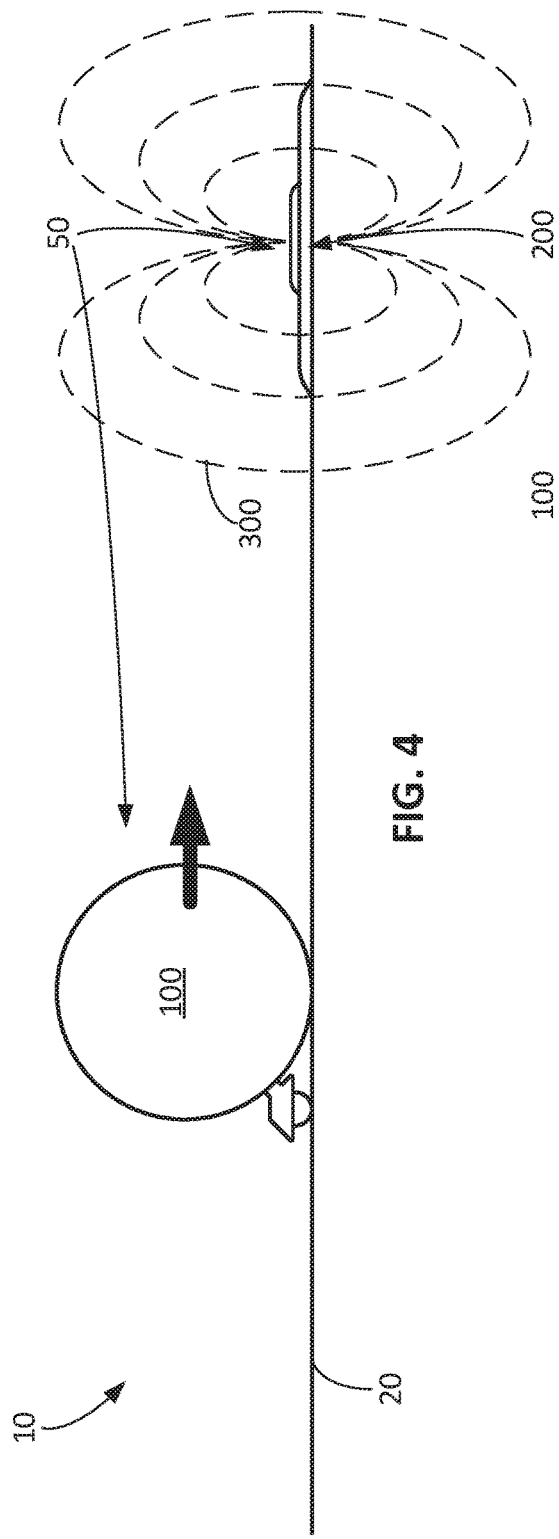
FIG. 4 is a front view of the charging system of FIG. 1, including the autonomous mobile robot and the charging station.

FIG. 4 illustrates an example of the robot 100 approaching the charging station 200 as the charging station 200 emits one or more magnetic field pulses into the environment 10. For example, the charging station 200 can emit magnetic field pulses 300. The robot 100 can move onto the charging station 200 from the floor surface 20 from any horizontal direction. In addition, the magnetic field pulses 300 are broadcast into the environment 10 such that the robot 100 can detect the magnetic field pulses 300 from any horizontal direction.

Figure 5:
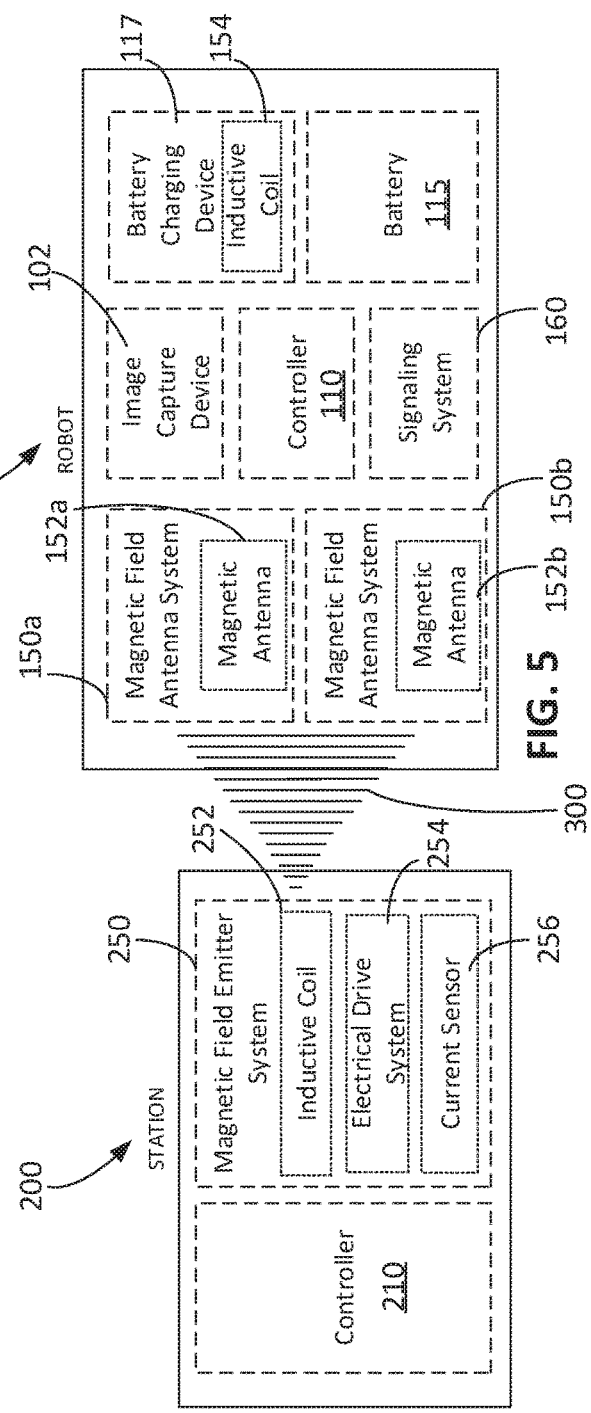
FIG. 5 is a block diagram of the charging system of FIG. 1.

FIG. 5 schematically illustrates a block diagram for the charging system 50, including a block representing the charging station 200 and a block representing the robot 100. In addition to including the magnetic field emitter system 250, the charging station 200 can include a controller 210. The controller 210 can execute instructions to perform operations for the charging station 200. The controller 210 is operably connected to the magnetic field emitter system 250. In some examples, the controller 210 is electrically connected to the magnetic field emitter system 250.

The magnetic field emitter system 250 can include an inductive coil 252, an electrical drive system 254, and a current sensor 256. As described herein, the magnetic field emitter system 250 is configured to produce the magnetic field pulses 300 in the environment 10. The magnetic field pulses 300 can be used to direct the robot 100 toward the charging station 200 or to charge the battery 115 of the robot 100.

The electrical drive system 254 can include circuitry that can be operated by the controller 210 to generate an electrical drive signal and to deliver the electrical drive signal to the inductive coil 252. The electrical drive signal drives the inductive coil 252. The electrical drive system 254 can, for example, include a microcontroller that generates a pulse width modulation (PWM) electrical signal pulse to be delivered to the inductive coil 252. In some implementations, the microcontroller corresponds to or is part of the controller 210. The electrical drive system 254 can include circuitry to transform the PWM electrical signal pulse into a sinusoidal electrical drive signal received by the inductive coil 252 (e.g., the PWM electrical signal can be used to modulate a sinusoidal carrier signal). The electrical drive system 254 can periodically generate electrical signal pulses to be delivered to the inductive coil 252.

The inductive coil 252 is electrically connected to the electrical drive system 254. The inductive coil 252 can receive the electrical drive signal (e.g., a PWM modulated electrical signal) from the electrical drive system 254. An electrical drive signal delivered through the inductive coil 252 by the electrical drive system 254 can cause the inductive coil 252 to generate a corresponding magnetic field pulse, e.g., one of the magnetic field pulses 300. The inductive coil 252, as described herein, can be positioned in the raised portion 206 (shown in FIG. 4) of the charging station 200. A coil axis of the inductive coil 252 can correspond to a vertical axis extending through the charging station 200, e.g., extending through a center of the charging station 200. The inductive coil 252 can be a circular inductive coil.

The current sensor 256 is electrically connected to the electrical drive system 254 and to the inductive coil 252. The current sensor 256 can detect changes in a current of an electrical drive signal transmitted through the inductive coil 252, e.g., the electrical drive signal delivered by the electrical drive system 254. For example, the current can have a sinusoidal waveform that can vary in response to the presence of foreign metallic objects near the current sensor 256, as described herein. Foreign metallic objects can include metallic objects that are not part of the charging station 200. Variation in the current can be indicative of the presence of a foreign metallic object.

The robot 100 includes the magnetic field antenna systems 150a, 150b, the image capture device 102, the controller 114, the battery 115, and the battery charging device 117. The robot 100 can also include a signaling system 160 to communicate with the charging station 200. The controller 114 can execute instructions to perform operations for the robot 100. The controller 114 is operably connected to the image capture device 102, the battery 115, the battery charging device 117, and the magnetic field antenna systems 150a, 150b. For example, the controller 114 can be electrically connected to these systems and devices.

The magnetic field antenna systems 150a, 150b each include a magnetic field antenna 152a, 152b. The magnetic field antennae 152a, 152b can have parallel coil axes such that the magnetic field antennae 152a, 152b are responsive to the same component of magnetic fields emitted in the environment 10. The magnetic field antennae 152a, 152b are receiver inductive coils configured to detect the magnetic field pulses 300 emitted by the inductive coil 252, which is a drive coil that emits the magnetic field pulses 300. The magnetic field antennae 152a, 152b independently generate electrical signals in response to the detecting the magnetic field pulses 300. Electrical characteristics of the electrical signals generated by the magnetic field antennae 152a, 152b can vary depending on a distance between the magnetic field antennae 152a, 152b and the inductive coil 252. As discussed herein, in some implementations, the characteristics are amplitudes of currents of the electrical signals. The amplitudes of the currents of the electrical signals generated by the magnetic field antenna 152a in response to detecting the magnetic field pulses can decrease as the distance between the magnetic field antenna 152a and the inductive coil 252 increases, e.g., can decrease at a rate of 1 over the distance cubed. Similarly, the amplitudes of the electrical signals generated by the magnetic field antenna 152b in response to detecting the magnetic field pulses can decrease as the distance between the magnetic field antenna 152b and the inductive coil 252 increases.—

The battery charging device 117, as described herein, is configured to charge the battery 115. The battery charging device 117 can include an inductive coil 154 that is configured to respond to the magnetic field pulse and generate current to charge the battery 115. Similar to the magnetic field antennae 152a, 152b, the inductive coil 154 is a receiver coil, except that the output from the inductive coil 154 is used to charge the battery 115 rather than to determine an orientation of the robot 100 relative to the charging station 200.

The signaling system 160 is used to signal to the charging station 200 that the robot 100 is near the charging station 200. As described herein, the charging station 200 can determine when a foreign metallic object is near the charging station 200. In particular, a foreign metallic object can cause a variation in a current detected by the current sensor 256. The robot 100 can cause a variation in the current detected by the current sensor 256 because of the electrical components and metal components of the robot 100. To signal to the charging station 200 that the robot 100 is not a foreign object, the signaling system 160 can be operated to cause a change in resonance between the charging station 200 and the robot 100 by changing a capacitance of circuitry of the robot 100. For example, the controller 114 operates the signaling system 160 to establish a specific capacitance that causes a certain variation in the current detected by the current sensor 256. The signaling system can cause the capacitance change when the robot 100 is in the docking position. The robot 100 can use the change in capacitance to authenticate itself to the charging station 200. For example, the variation in the current detected by the current sensor 256 can be indicative of the presence of the robot 100. Based on this variation in the current, the charging station 200 can determine that the foreign object triggering the variation in the current is the robot 100 and then provide charging power to the robot 100.

In some implementations, the charging station 200 counts a rate of decay of its the number of pulses in the decay of the electrical signal transmitted through the inductive coil 252 of the magnetic field emitter system 250 to determine a size of a foreign object (described with respect to FIGS. 8A-8D and 9). For example, the charging station 200 can determine the number of pulses of the electrical signal before the amplitude decays to a certain value, e.g., 1 to 20% of the maximum amplitude of the electrical signal. Based on the number of pulses counted, the charging station 200 can determine a size of the foreign object. The robot 100 can at first appear to be a large foreign object. In implementations in which a battery of the robot 100 has low charge, e.g., less than 10% charge, the charging station 200 can provide a minimum amount of time for the robot 100 placed upon the charging station 200 to power up and then authenticate itself to the charging station 200. If the charging station 200 does not receive the authentication signal, the charging station 200 ceases providing continuous charging power and presents a user-perceptible indication that a foreign object has been detected. For example, the charging station 200 can flash a different color light-emitting diode to indicate this, and can also change the pulse rate to signal to an approaching robot that the charging station 200 has a foreign object on it and docking is not available.

Example Processes

The robot 100 and the charging station 200 can be controlled in accordance with processes described herein. While some of the operations of these are described being performed by the robot 100, by the charging station 200, or by a user, in some implementations, one or more of the operations can be performed by a remote computing system in wireless communication with the robot 100, the charging station 200, or both the robot 100 and the charging station 200. Other variations are possible. Furthermore, while the methods, processes, and operations described herein are described as including certain operations or sub-operations, in other implementations, one or more of these operations or sub-operations may be omitted, or additional operations or sub-operations may be added.

Figure 6A:
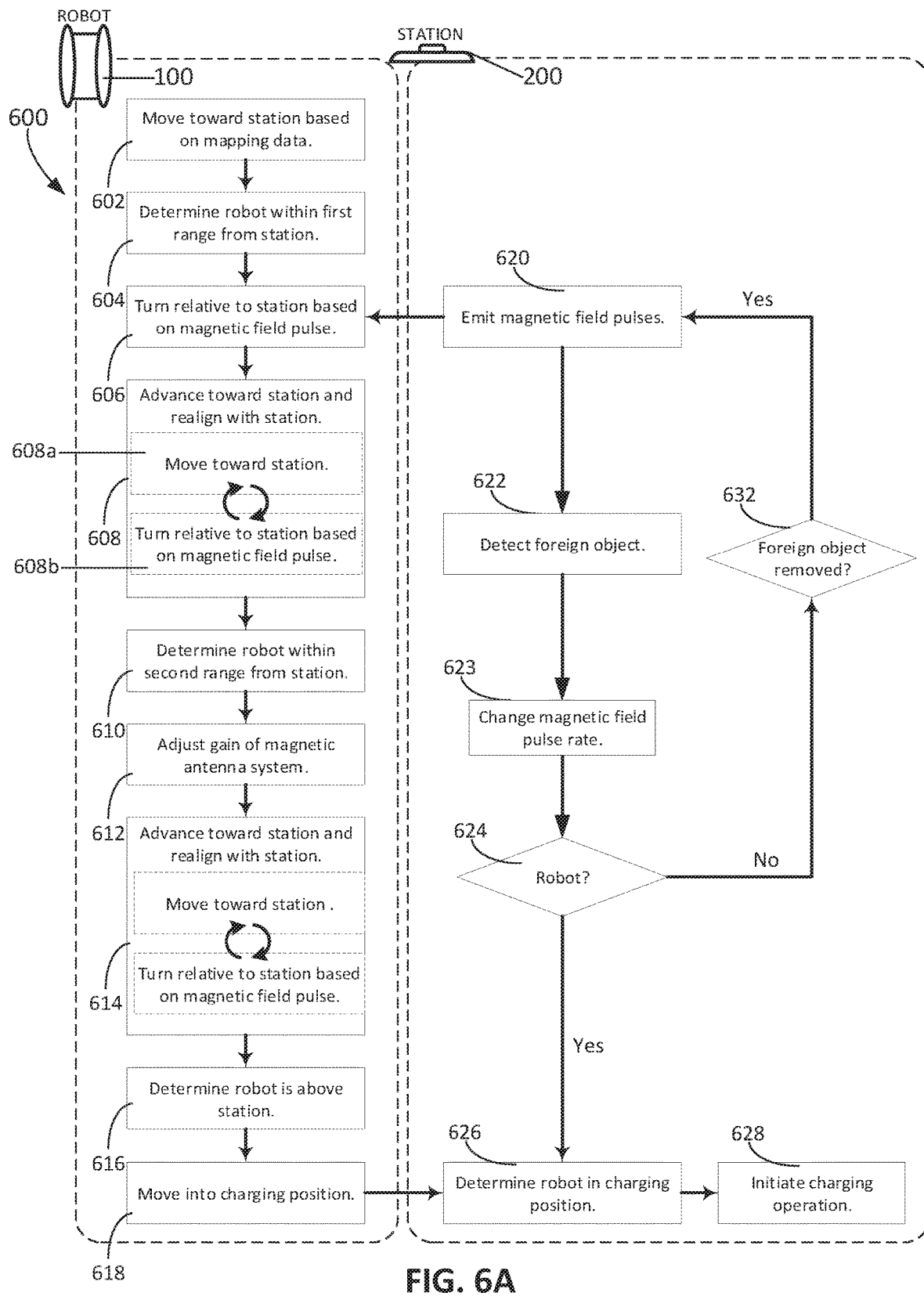
FIG. 6A is a flowchart of a process for docking an autonomous mobile robot to a charging station.

FIG. 6A illustrates a flowchart of a process 600 for docking an autonomous mobile robot, e.g., the robot 100, to a charging station, e.g., the charging station 200. The process 600 is described with respect to the robot 100 and the charging station 200 (shown in FIG. 1), but in some implementations, the process 600 is performed by another autonomous mobile robot, another charging station, or both another autonomous mobile robot and another charging station. The process 600 is performed to reorient the robot 100 relative to the charging station 200 as the robot 100 approaches the charging station 200, and to initiate charging of the battery 115 of the robot 100 once the robot 100 is docked to the charging station 200. The process includes operations 602, 604, 606, 608, 610, 612, 614, 616, 618, 620, 622, 623, 624, 626, 628, 632. The operations 602, 604, 606, 608, 610, 612, 614, 616, and 618 can be performed by the robot 100, and the operations 620, 622, 623, 624, 626, 628, 632 can be performed by the charging station 200.

In the operation 602, the robot 100 moves toward the charging station 200 based, for example, on mapping data. While the robot 100 is moving toward the charging station 200, in the operation 620, the charging station 200 emits magnetic field pulses (e.g., similar to the magnetic field pulses 300 described herein). The charging station 200 can periodically emit magnetic field pulses. In some implementations, the charging station 200 emits magnetic field pulses at a rate of 1 to 20 pulses per second, e.g., 1 to 10 pulses per second, 1 to 5 pulses per second, 3 to 7 pulses per second, 5 to 10 pulses per second, or 10 to 20 pulses per second. A pulse repetition period for emitting the magnetic field pulses can be between 50 and 1000 milliseconds, e.g., between 100 and 300 milliseconds, 100 and 500 milliseconds, 300 and 700 millisecond, or 500 millisecond and 1000 milliseconds.

Figure 7A:
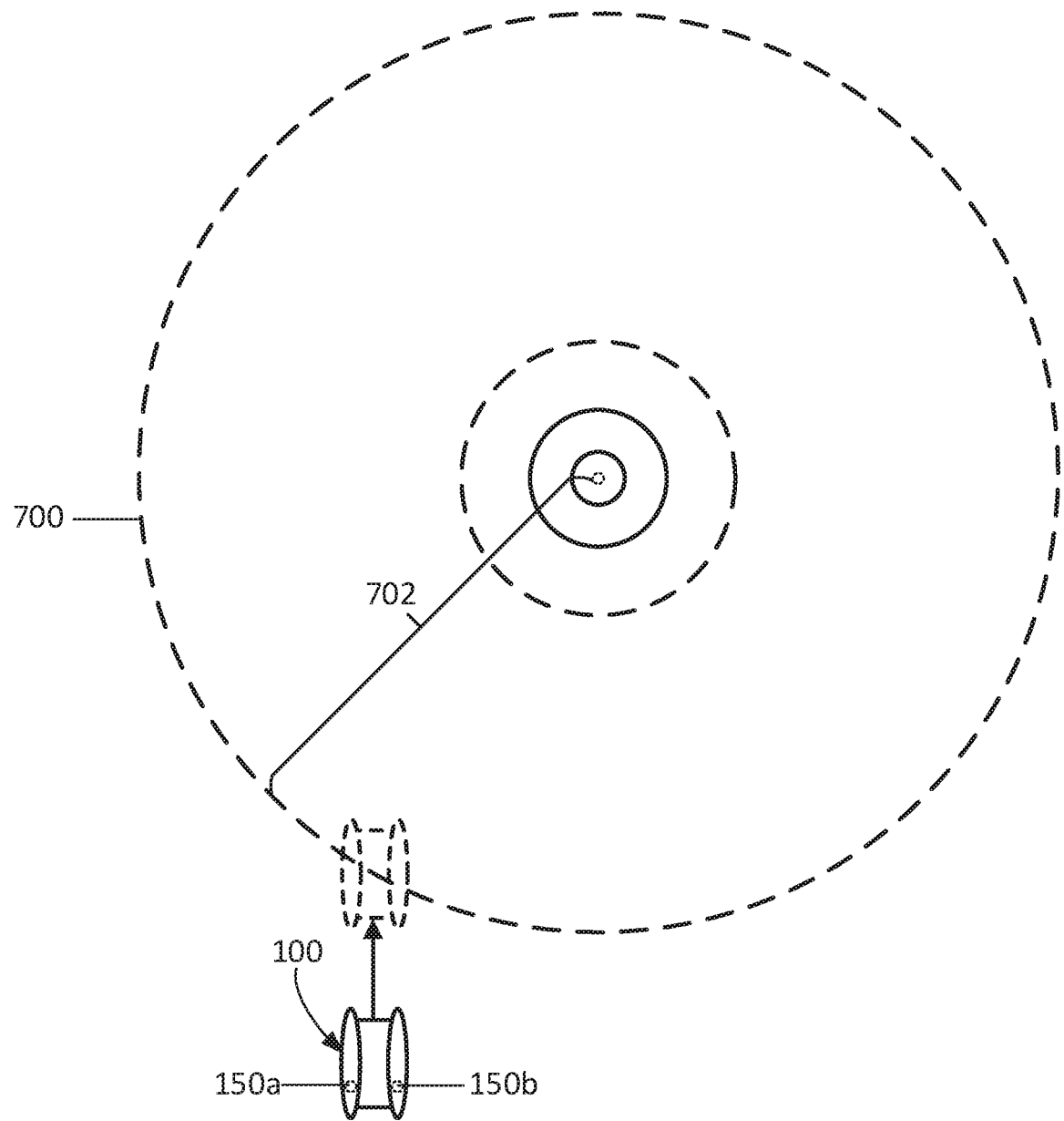
FIGS. 7A-7E illustrate a charging system including an autonomous mobile robot and a charging station during the process of FIG. 6A.

Referring also to FIG. 7A, the robot 100 moves toward the charging station 200 based on the mapping data when the robot 100 is positioned outside a range 700. The range 700 corresponds to an area within the environment 10 that is within a distance 702 from the charging station 200. In some implementations, the distance 702 is a distance from the magnetic field emitter system 250 of the charging station 200. When the robot 100 is positioned outside of the range 700, the robot 100 can use the mapping data for navigating toward the charging station 200. In some implementations, the robot 100 uses the mapping data for navigating toward the charging station 200 when one of or both of the magnetic field antenna systems 150a, 150b is positioned outside of the range 700, i.e., when a distance between at least one of the magnetic field antenna systems 150a, 150b and the charging station 200 is greater than the distance 702. In some implementations, the distance 702 is between 1 meter and 3 meters, e.g., between 1 and 2 meters, 1.5 and 2.5 meters, or 2 and 3 meters.

When the robot 100 is outside the range 700, the magnetic field antenna systems 150a, 150b can generate electrical signals in response to detecting the magnetic field pulses emitted by the charging station 200. The robot 100 can monitor the electrical signals generated by the magnetic field antenna systems 150a, 150b without using these electrical signals to determine a heading of the robot 100. The signals can indicate to the robot 100 when the robot 100 or its magnetic field antenna systems 150a, 150b are within the range 700.

Figure 8A:
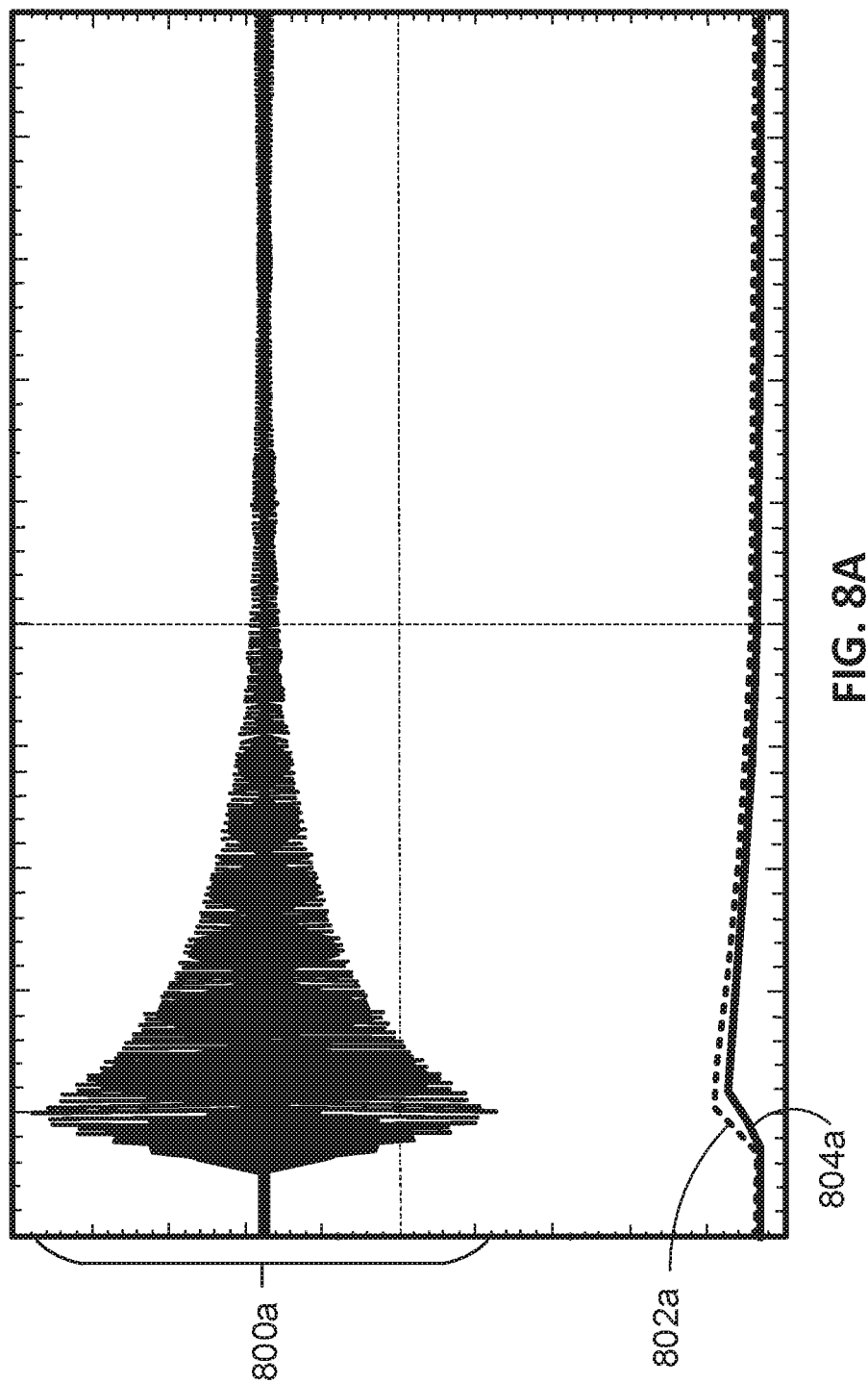
Figure 9:
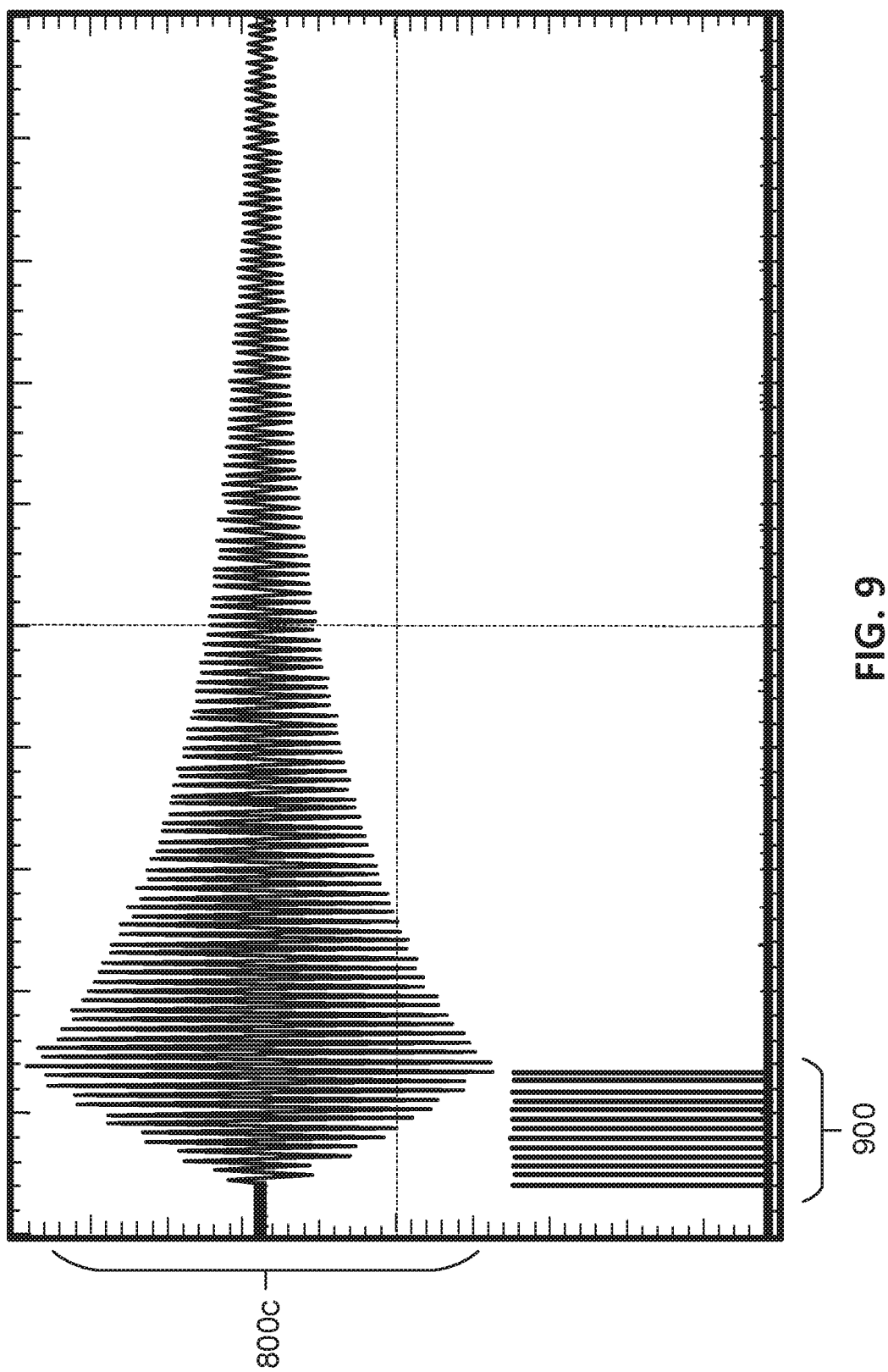
FIG. 9 illustrates a waveform transmitted through a magnetic field emitter system and a waveform to drive the magnetic field emitter system.

FIG. 8A illustrates a waveform 800a of an electrical signal transmitted through the inductive coil 252 of the magnetic field emitter system 250 of the charging station 200, a waveform 802a of an electric signal produced by the magnetic field antenna 152a of the magnetic field antenna system 150a of the robot 100, and a waveform 804a of an electrical signal produced by the magnetic field antenna 152b of the magnetic field antenna system 150b of the robot 100. The waveforms 800a, 802a, 804a are representative of currents of the electrical signals when the robot 100 is positioned outside of the range 700 (shown in FIG. 7A). In some implementations, the waveform 800a is produced by driving the inductive coil 252 of the magnetic field emitter system 250 with one or more electrical drive pulses. Referring briefly to FIG. 9, in some examples, the electrical drive system 254 can transmit multiple PWM pulses 900 to cause the inductive coil 252 to produce the waveform 800a. The waveform 800a can then naturally decay after the pulses 900 are transmitted.

Referring back to FIG. 8A, compared to currents of the electrical signals shown in FIG. 8B (as discussed below) when the robot 100 is closer to the charging station, the currents of the electrical signals shown in FIG. 8A are relatively low. Because of the low amplitude of the electrical signals, differences between the current of the electrical signal produced by the magnetic field antenna 152a and the current of the electrical signal produced by the magnetic field antenna 152b may be difficult to detect. In this regard, the robot 100, in the operation 602 while the robot 100 is outside of the range 700, uses the mapping data rather than the electrical signals produced by the magnetic field antennae 152a, 152b to navigate the robot 100 toward the charging station 200 and to move the robot 100 to a position within the range 700.

The mapping data can correspond to data collected by the robot 100. In some implementations, the mapping data can include data collected by other electronic devices in the environment 10. For example, one or more autonomous mobile robots in addition to the robot 100 can operate the environment 10, and can generate mapping data using their mapping sensors. Their mapping sensors can be similar to mapping sensors of the robot 100. The mapping data can be stored on, for example, a remote computing system such as a cloud computing server. The robot 100 can access at least these mapping data in the operation 602 as the robot 100 moves toward the charging station 200.

The robot 100 can begin moving toward the charging station 200 in the operation 602 in response to a command to initiate a docking operation to move the robot 100 to the charging station 200 to the charge the battery 115. In some implementations, this command can be initiated by a user. The user can operate a user interface of the robot 100 to provide a command to the robot 100 to initiate the docking operation. In some implementations, the controller 114 of the robot 100 can initiate the docking operation without user intervention. For example, as the robot 100 moves about the environment 10, the robot 100 can initiate the docking operation in response to a charge level of the battery 115 of the robot 100 being no more than a threshold level. The battery 115 being no more than the threshold level can indicate that a charge level of the battery 115 is low, and that the battery 115 needs to be recharged.

At the operation 604, the robot 100 determines that it is in the range 700 from the charging station 200. The robot 100 can estimate a distance between the robot 100 and the charging station 200 based on an electrical signal generated by the magnetic field antenna system 150a, an electric signal generated by the magnetic field antenna system 150b, the mapping data, or a combination thereof. In some implementations that the robot 100 is within the range 700 when a value of an electrical characteristic of the electrical signal generated by the magnetic field antenna system 150a and a value of an electrical characteristic of the electrical signal generated by the magnetic field antenna system 150b are within a saturation value of the electrical characteristic. For example, the electrical characteristics can be currents of the electrical signals. The robot 100 can determine that it is within the range 700 from the charging station 200 when the amplitudes of the currents are no more than 10% to 50% of the saturation values for the currents, e.g., no more than 10%, 20%, 30%, 40%, or 50% of the saturation values for the currents.

Figure 7B:
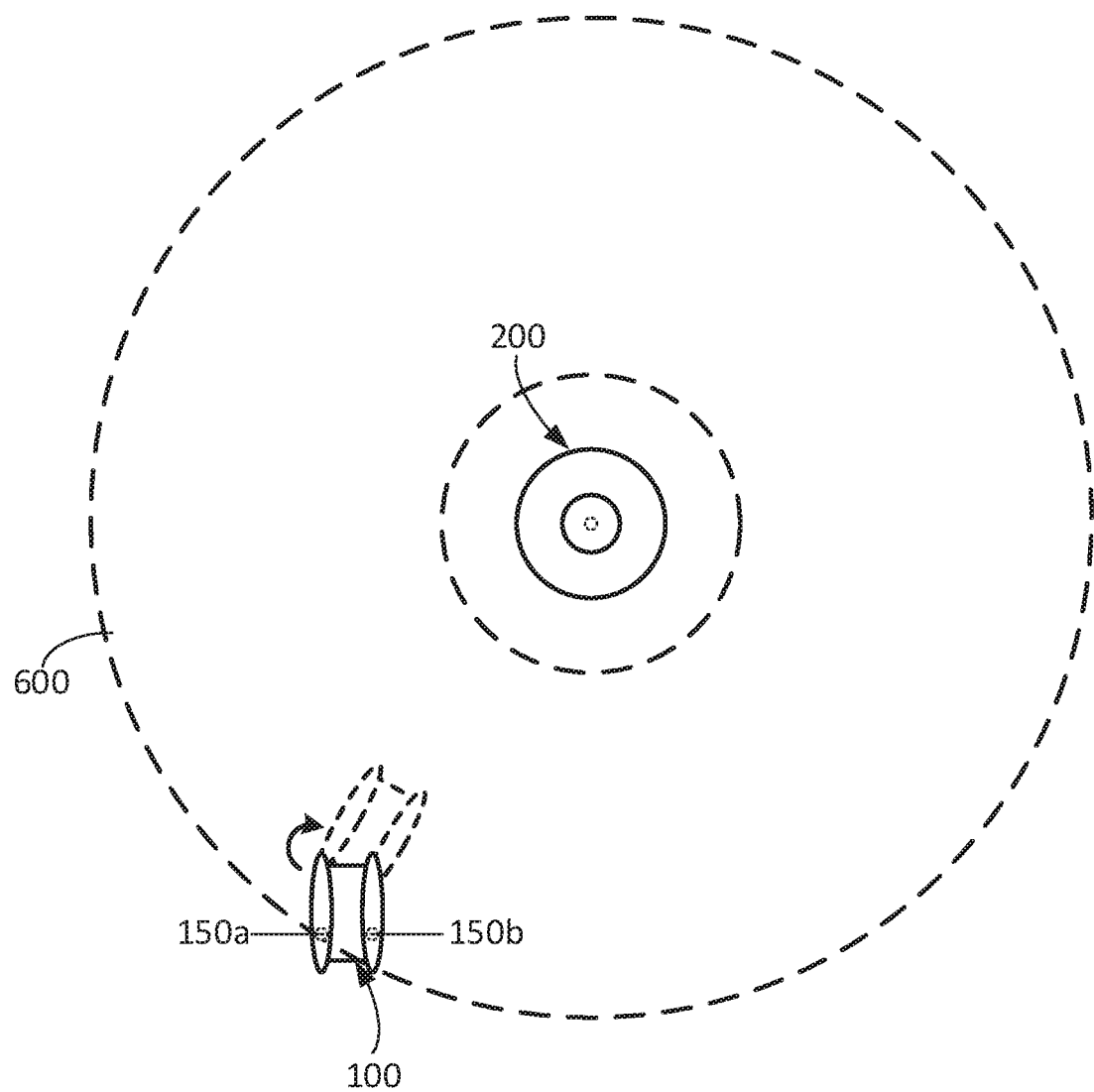

As shown in FIG. 7B, the robot 100 can determine when it is in the range 700 from the charging station 200 when both the magnetic field antenna system 150a and the magnetic field antenna system 150b are within the range 700. In some implementations, the robot 100 can determine that it is in the range 700 from the charging station when one of the magnetic field antenna systems 150a, 150b is within the range 700. Alternatively or additionally, the robot 100, based on the electrical signals produced by the magnetic field antenna systems 150a, 150b, can determine a position of the center of the robot 100 relative to the charging station 200. The robot 100 can determine that the robot 100 is within the range 700 when the center of the robot 100 is within the range 700.

Once the robot 100 is within the range 700 as determined at the operation 604, the robot 100 can initiate navigation based on outputs of the magnetic field antenna systems 150a, 150b. At the operation 606, the robot 100 turns relative to the charging station 200 based on the magnetic field pulse emitted by the charging station 200. The robot 100 can, for example, turn toward the charging station 200 such that a forward drive direction is directed toward the charging station 200. In some implementations, the robot 100 can turn while also advancing in the forward drive direction. The robot 100 can reorient itself in response to determining that the magnetic field antenna system 150a is closer to the charging station 200 than the magnetic field antenna system 150b, or in response to determining that the magnetic field antenna system 150b is closer to the charging station 200 than the magnetic field antenna system 150a.

Figure 6B:
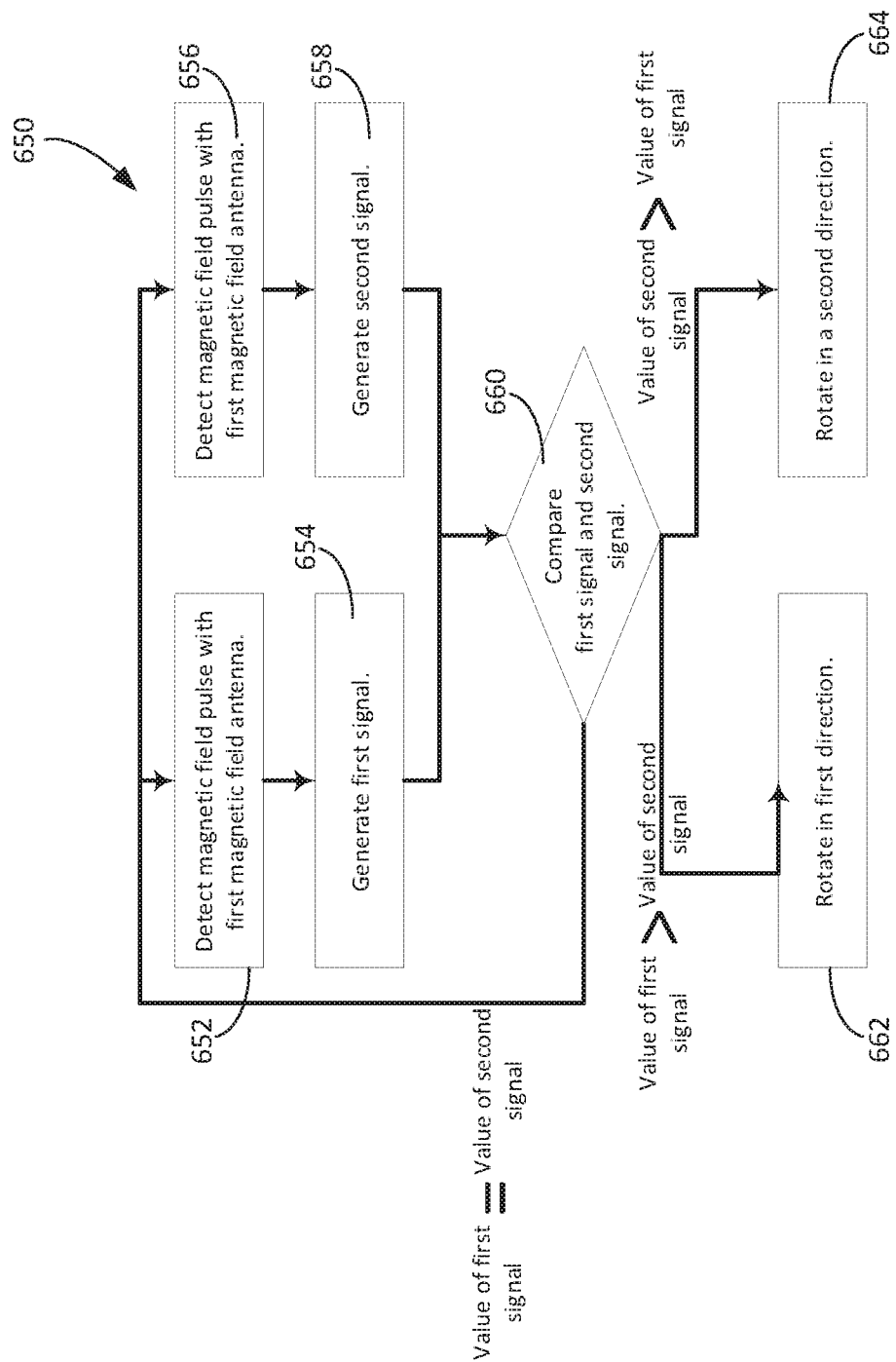
FIG. 6B is a flowchart of a process for reorienting an autonomous mobile robot relative to a charging station.

At the operation 606, the robot 100 can determine a direction to turn relative to the charging station 200 using a process 650 depicted in FIG. 6B. As discussed herein, the magnetic field antenna systems 150a, 150b can produce electrical signals in response to detecting a magnetic field pulse emitted by the charging station 200. The process 650 includes operations 652, 654, 656, 658, 660, 662, 664.

At the operation 652, the robot 100 detects a magnetic field pulse with a first magnetic field antenna, e.g., the magnetic field antenna system 150a. At the operation 654, the robot 100 generates a first signal. For example, the robot 100 can generate a first electrical signal in response to the magnetic field antenna system 150a detecting the magnetic field pulse, as described herein. Similarly, at the operation 654, the robot 100 detects a magnetic field pulse with a second magnetic field antenna system, e.g., the magnetic field antenna system 150b. At the operation 654, the robot 100 generates a second signal. For example, the robot 100 can generate a second electrical signal in response to the magnetic field antenna system 150b detecting the magnetic field pulse, as described herein. And as described herein, the first and second signals can be electrical signals.

At the operation 660, the first signal is compared with the second signal. A value of the first signal can be compared to a value of the second signal. For example, the electrical characteristics of the electrical signals produced by the magnetic field antennae 152a, 152b can be, as described herein, currents of the electrical signals. Amplitudes of the currents of these electrical signals can be indicative of positions of the magnetic field antennae 152a, 152b relative to the inductive coil 252 of the magnetic field emitter system 250.

FIG. 8B illustrates a waveform 800b (similar to the waveform 800a of FIG. 8A) of an electrical signal transmitted through the inductive coil 252 of the magnetic field emitter system 250, a waveform 802b of an electric signal produced by the magnetic field antenna 152a of the magnetic field antenna system 150a, and a waveform 804b of an electrical signal produced by the magnetic field antenna 152b of the magnetic field antenna system 150b. The waveforms 800b, 802b, 804b are representative of currents of the electrical signals when the robot 100 is positioned within the range 700 (shown in FIG. 7A). Compared to currents of the waveforms 802a, 804a shown in FIG. 8A when the robot 100 is further from the charging station 200, the currents of the waveforms 802b, 804b shown in FIG. 8A are higher.

The comparison of the first and second values performed at the operation 660 can vary in implementations. The first and second values can vary depending on a strength of the magnetic field pulse detected at the magnetic field antenna system 150a and a strength of the magnetic field pulse at the magnetic field antenna system 150b. In some implementations, the first and second values are maximum amplitudes of the electrical signals produced by the first and second magnetic field antennae 152a, 152b, respectively. In some implementations, amplitudes of the currents of the waveforms 802b, 804b after a certain period of time of decay can be compared to one another.

In some implementations, the first and second values are indicative of amplitudes over a period of time. For example, the values can be calculated by integrating the amplitudes over the period of time. FIG. 8C illustrates a waveform 800c of an electrical signal (similar to the waveform 800a of FIG. 8A) transmitted through the inductive coil 252 of the magnetic field emitter system 250, a waveform 802c of an electric signal produced by the magnetic field antenna 152a of the magnetic field antenna system 150a, and a waveform 804c of an electrical signal produced by the magnetic field antenna 152b of the magnetic field antenna system 150b. In this regard, the waveforms 802c, 804c can correspond to electrical signals produced by the robot 100 in a position of the robot 100 is closer to the magnetic field emitter system 250 than a position of the robot 100 to produce the waveforms 802b, 804b depicted in FIG. 8B. As shown in FIG. 8C, the magnetic field pulse sent by the magnetic field emitter system 250 (in response to the electrical drive signal corresponding to the waveform 800c) can cause the magnetic field antenna systems 150a, 150b to produce signals with clipped portions 808, 810, respectively. The clipped portions 808, 810 may be clipped due to saturation of the electrical circuitry of the magnetic field antenna systems 150a, 150b. The clipped portion 808 for the waveform 802c can have a duration that differs from a duration of the clipped portion 810 for the waveform 804c. Durations of the clipped portions 808, 810 can correspond to the values compared at the operation 660 and can be indicative of which of the magnetic field antenna systems 150a, 150b is closer to the magnetic field emitter system 250. In the example depicted in FIG. 8C, the clipped portion 810 has a longer duration than the clipped portion 808 and therefore the magnetic field antenna system 150b is closer to the magnetic field emitter system 250 than the magnetic field antenna system 150a.

Figure 8D:
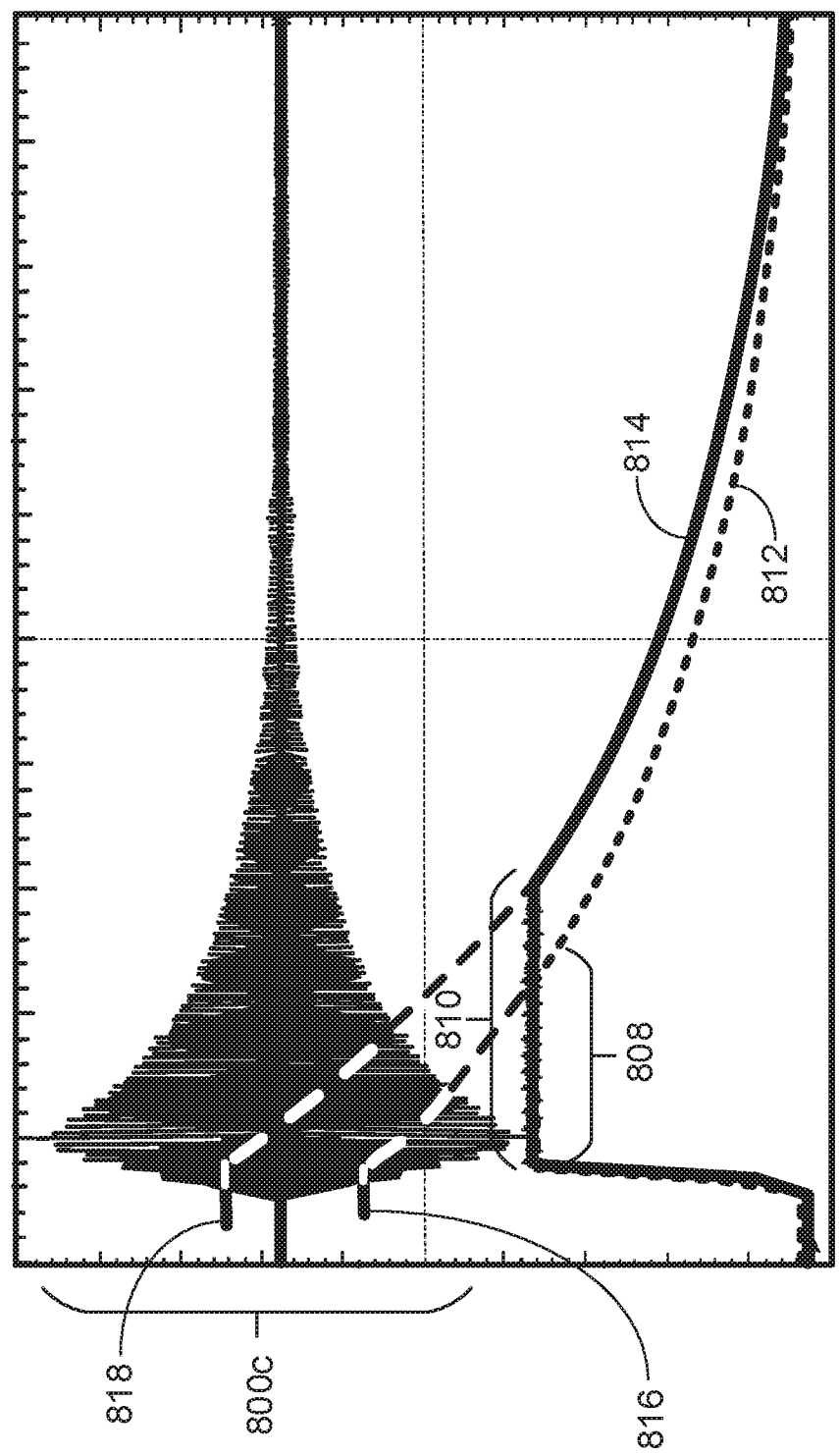

In some implementations, referring to FIG. 8D, the first and second values are indicative of a value extrapolated from non-clipped portions 812, 814 of the waveforms 802c, 804c. The non-clipped portions 812, 814 are portions of the waveforms 802c, 804c that are not clipped due to saturation. The non-clipped portions 812, 814 can be exponentially declining portions that decline in response to the natural decay of the magnetic field pulse (which naturally decays in response to the natural decay of the electrical drive signal of the inductive coil 252). The robot 100 can obtain a first value 816 by extrapolating the non-clipped portion 812, and a second value 818 by extrapolating the non-clipped portion 814. As shown in the example of FIG. 8D, the second value 818 is higher than the first value 816.

Returning to FIG. 6B, at the operation 660, if the value of the first signal is equal to the value of the second signal (with the values being calculated using one or more of the methods described herein), the robot 100 does not rotate. The robot 100 can continue advancing in a forward drive direction without rotating relative to the charging station 200.

If the value of the first signal differs from the value of the second signal, the robot 100 can reorient itself relative to the charging station 200 such that a difference between a value of the first signal and a value of the second signal decreases. The value of the first signal differing from the value of the second signal can indicate that one of the magnetic field antenna system 150a or the magnetic field antenna system 150b is closer to the charging station 200 and can further indicate that a strength of the magnetic field pulse detected at the magnetic field antenna system 150a differs from a strength of the magnetic field pulse at the magnetic field antenna system 150b.

If the value of the first signal is greater than the value of the second signal, at the operation 662, the robot 100 can rotate in a first direction. In examples in which the values are indicative of electrical current amplitudes of the first and second signals, the value of the first signal being greater than the value of the second signal can indicate that the magnetic field antenna 152a is closer to the inductive coil 252 of the magnetic field emitter system 250 than the magnetic field antenna 152b is to the inductive coil 252 and can further indicate that a strength of the magnetic field pulse detected at the magnetic field antenna system 150a is greater than a strength of the magnetic field pulse at the magnetic field antenna system 150b. To equalize values of subsequent first and second signals produced by the magnetic field antennae 152a, 152b, the robot 100 can rotate in the first direction. In the example of the robot 100, the first direction corresponds to a counterclockwise or leftward direction.

If the value of the second signal is greater than the value of the first signal, at the operation 664, the robot 100 can rotate in a second direction. In examples in which the values are indicative of electrical current amplitudes of the first and second signals, the value of the second signal being greater than the value of the first signal can indicate that the magnetic field antenna 152b is closer to the inductive coil 252 than the magnetic field antenna 152a is to the inductive coil 252 and can further indicate that a strength of the magnetic field pulse detected at the magnetic field antenna system 150b is greater than a strength of the magnetic field pulse at the magnetic field antenna system 150a. To equalize values of subsequent first and second signals produced by the magnetic field antennae 152a, 152b, the robot 100 can rotate in the second direction. In the example of the robot 100, the first direction corresponds to a clockwise or rightward direction.

The operations 662, 664 aligns the forward drive direction of the robot 100 with the charging station 200. The forward drive direction of the robot 100 can be aligned with a center of the charging station or with an axis of the inductive coil 252 of the magnetic field emitter system 250 when the values of the first and second signals are equalized.

Referring back to the process 600 depicted in FIG. 6A, after the operation 606, at the operation 608, the robot 100 can advance toward the charging station 200 and realign with the charging station 200. At a suboperation 608a, the robot 100 moves toward the charging station, and at a suboperation 608b, the robot 100 turns relative to the charging station 200 based on the magnetic field pulse. During the suboperation 608b, the robot 100 can repeatedly perform the process 650 to equalize values of first and second signals produced by the robot 100 and align the forward drive direction of the robot 100 with the charging station 200. The suboperations 608a and 608b can occur simultaneously or sequentially. The robot 100 can repeat the process 650 for each magnetic field pulse emitted by the charging station 200. The process 650 thus allows the robot 100 to correct a heading of the robot 100 as the robot 100 approaches the charging station 200 during the docking operation. A heading of the robot 100 may become misaligned with the charging station 200 due to drift or other potential errors.

Figure 7C:
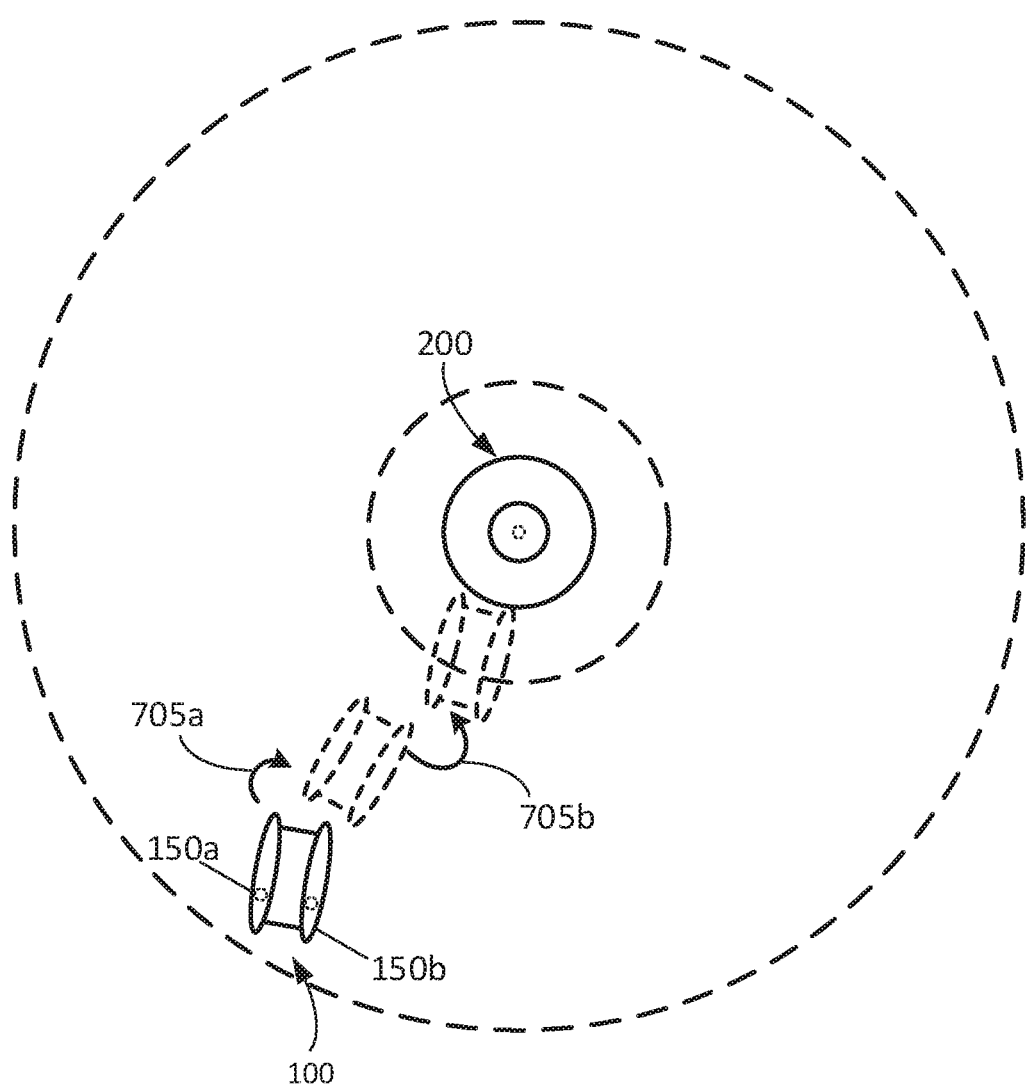

Referring to FIG. 6C, the robot 100 can perform multiple heading corrections 705a, 705b. The heading corrections 705a, 705b can be performed through multiple iterations of the process 650 during the operation 608. For example, the heading correction 705a can be performed during a first iteration of the process 650 in which the magnetic field antenna systems 150a, 150b produce first and second signals in response to a first magnetic field pulse emitted by the magnetic field emitter system 250. The heading correction 705b can be performed during a second iteration of the process 650 in which the magnetic field antenna systems 150a, 150b produce third and fourth signals in response to a second magnetic field pulse emitted by the magnetic field emitter system 250. As shown in FIG. 7C, the heading correction 705a can include a clockwise turn, and the heading correction 705b can include a counterclockwise turn.

Figure 7D:
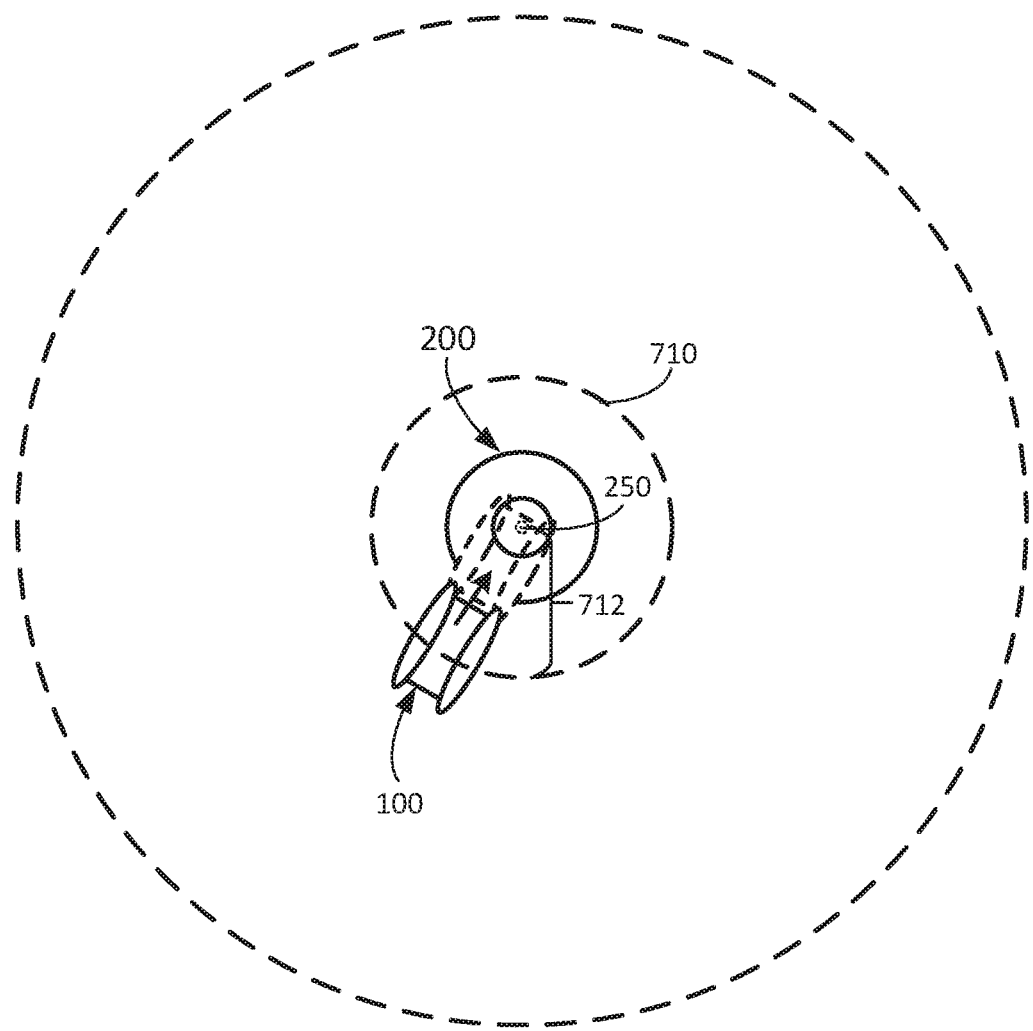

Referring back to the process 600 depicted in FIG. 6A, after the operation 608, at the operation 610, the robot 100 determines that the robot 100 is within a range 710 (shown in FIG. 7D). Referring also to FIG. 7D, the robot 100 can continue to perform the operation 608 in which the robot 100 advances toward the charging station 200 and turns relative to the charging station 200 until the robot 100 is within the range 710. The range 710 corresponds to an area within the environment 10 that is within a distance 712 from the charging station 200. In some implementations, the distance 712 is a distance from the magnetic field emitter system 250 of the charging station 200. When the robot 100 is positioned outside of the range 700, the robot 100 can use the mapping data for navigating toward the charging station 200. In some implementations, the robot 100 uses the mapping data for navigating toward the charging station 200 when one of or both of the magnetic field antenna systems 150a, 150b is positioned outside of the range 712, i.e., when a distance between at least one of the magnetic field antenna systems 150a, 150b is greater than the distance 712. In some implementations, the distance 702 is between 10 and 50 centimeters, e.g., between 10 and 30 centimeters, 20 and 40 centimeters, or 30 and 50 centimeters.

Once the robot 100 is within the range 710, at the operation 612, the robot 100 can adjust gains of the magnetic field antenna systems 150a, 150b. When the robot 100 is within the range 710, the magnetic field pulses emitted by the magnetic field emitter systems have high strengths. The gains can be decreased by 10% to 90%. With the decrease in gains, the magnetic field antenna systems 150a, 150b can decrease the period of time that their electrical signals (produced in response to the magnetic field pulses) would reach saturation values. For example, referring briefly to FIG. 8C, the clipped portions 808, 810 of the waveforms 802c, 804c can have smaller durations of time.

At the operation 614, the robot 100 advances toward the charging station 200 and realigns with the charging station 200. The operation 614 is similar to the operation 608 except that the gains of the magnetic field antenna systems 150a, 150b during the operation 608 are higher than the gains of the magnetic field antenna systems 150a, 150b during the operation 610.

At the operation 616, the robot 100 determines that the robot 100 is above the charging station 200. In some implementations, the robot 100 determines that the robot 100 is above the charging station 200 in response to the magnetic field pulses no longer being detectable by one or both of the magnetic field antenna systems 150a, 150b. The inductive coil 252 of the magnetic field emitter system 250 can produce a toroidal-shaped magnetic field with a center coincident with an axis of the inductive coil 252. As a result, when the robot 100 is sufficiently close to the center of the charging station 200, e.g., sufficient close to the axis of the inductive coil 252, one or both of the magnetic field antenna systems 150a, 150b is unable to detect the magnetic field pulses. This is because the direction of the magnetic field pulses at the location of the magnetic field antenna system 150a or 150b or at the locations of the magnetic field antenna systems 150a, 150b is orthogonal to the detection axes of the magnetic field antenna systems 150a, 150b.

Figure 7E:
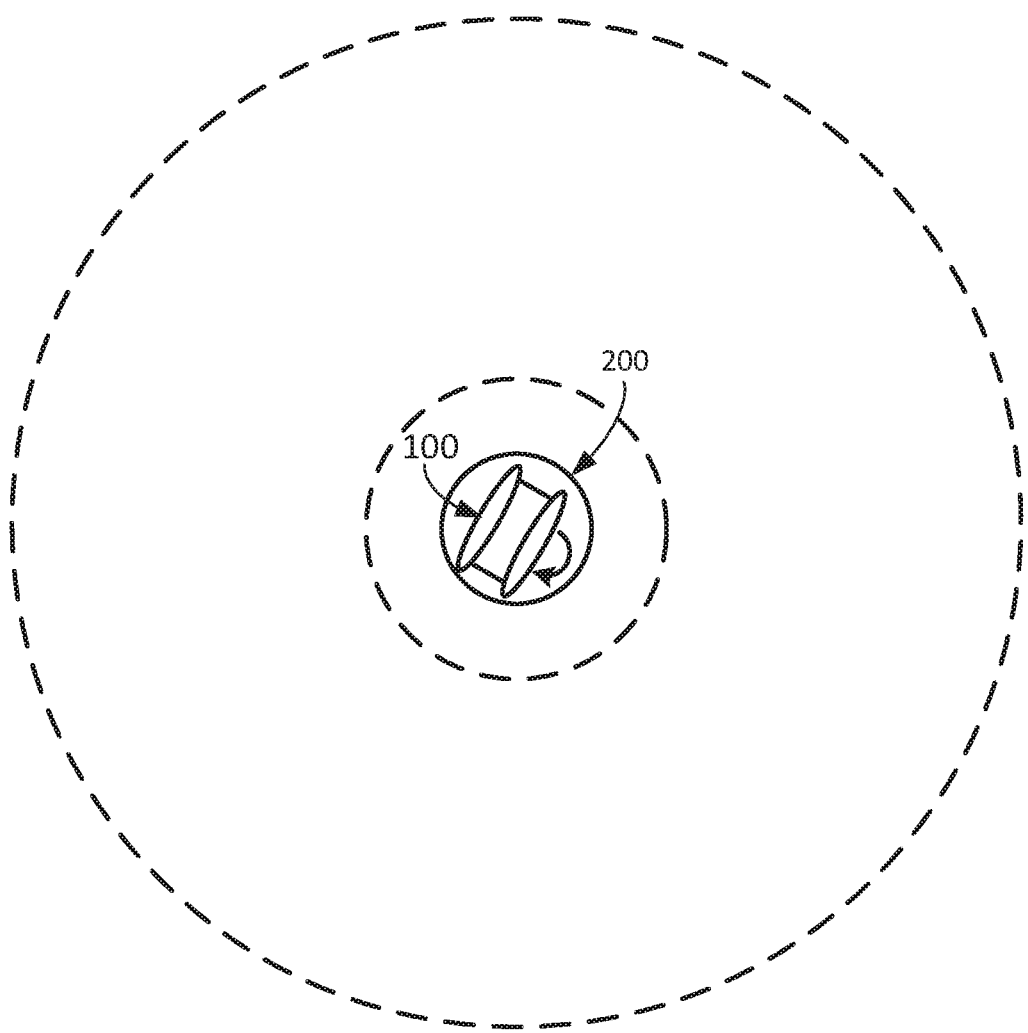

When the robot 100 determines that the robot 100 is above the charging station 200, at the operation 618, the robot 100 can move into a charging position. Referring to FIG. 7E, the robot 100 can perform a movement relative to the charging station 200 that causes the robot 100 to move into the charging position. The charging station 200 can include mechanical features that guide the robot 100 such that the battery charging device 117 (shown in FIG. 2B) is aligned with the magnetic field emitter system 250. For example, the charging station 200 can include raised features on the base 204 that contact corresponding features on the robot 100. These raised features on the base 204, for example, can be part of the raised portion 206 (shown in FIG. 3A). In particular, the raised portion 206 can contact inner edges 130a, 130b of the drive wheels 110a, 110b to align the battery charging device 117 with the magnetic field emitter system 250. In the charging position, a center of the robot 100 corresponds to a center of the inductive coil 154 of the battery charging device 117 and is aligned with a center of the charging station 200, which corresponds to a center of the inductive coil 252. In some implementations, the robot 100 rotates to move into the charging position. The robot 100 can, for example, rotate in place 180 degrees such that the raised portion 206 guides the robot 100 into the charging position.

Before initiating the charging operation, the charging station 200 at the operation 622 detects a foreign object. In particular, the charging station 200 determines that a foreign object is present near the charging station 200 or within a threshold range from the charging station. For example, the charging station 200 can determine that the foreign object is no more than 15 to 50 centimeters from the charging station 200. In some implementations, the charging station 200 can determine that the foreign object is directly above the charging station 200, e.g., within 1 to 10 centimeters from the charging station 200.

At the operation 623, the charging station 200 can change the magnetic field pulse rate. In particular, the charging station 200 can change the rate at which it emits magnetic field pulses when determining whether the foreign object is the robot 100. If the robot 100 is the foreign object, this change in the pulse rate can communicate to the robot 100 such that the robot 100 can respond to the charging station 200 to indicate that the foreign object is the robot 100. The foreign object can be a metallic object that changes the current detected by the current sensor 256.

At the operation 624, the charging station 200 determines whether the foreign object is the robot 100, e.g., by detecting an authentication signal from the robot 100 as described herein. If the foreign object is not the robot 100, the charging station 200 can provide user feedback to indicate to the user that the user should remove the foreign object from its location near the charging station 200. For example, the charging station 200 can include a user interface that provides this user feedback, e.g., by providing flashing indicator lights indicative of the presence of the foreign object. In some implementations, the charging station 200 can wirelessly communicate with a user computing device to cause the user computing device to provide the feedback (e.g., present a graphical alert that a foreign object is present and should be removed). Alternatively or additionally, the charging station 200 can change a pulse rate, and this change in the pulse rate is detectable by the robot 100. The robot 100 can determine that the charging station 200 is indicating that a foreign object has been detected and then communicate with the user computing device to provide the feedback. When the foreign object is removed, the charging station 200 can continue with the operation 620 and begin emitting magnetic field pulses again.

If the foreign object is the robot 100, the robot 100 can detect, using its magnetic field antenna systems 150*a*, 150*b*, this rate change and then operate its signaling system 160 to communicate with the charging station 200 to indicate a presence of the robot 100. The robot 100 can indicate to the charging station 200 the presence of the robot 100 at the charging station 200 and that the foreign object detected by the charging station 200 is the robot 100. For example, as described herein, the robot 100 can operate the signaling system 160 to produce a switched resonant capacitance change detectable by the charging station 200. The charging station 200 can detect the capacitance change using the current sensor 256. In particular, the capacitance change can cause the electrical current detected by the current sensor 256 to change. When the charging station 200 detects this capacitance change, the charging station 200 can continue to emit magnetic field pulses to guide the robot 100 to its charging position.

At the operation 626, the charging station 200 determines that the robot 100 is in the charging position. For example, the robot 100 can communicate that it is in charging position using the signaling system 160, e.g., by producing another detectable capacitance change. Alternatively or additionally, the charging station 200 can determine that the robot 100 is in the charging position when a value of the signal detected by the current sensor 256 is no less than a threshold value indicating that the robot 100 is in the charging position.

At the operation 628, in response to determining that the robot 100 is in the charging position, the charging station 200 initiates a charging operation. The charging station 200 can use its magnetic field emitter system to emit magnetic field charging pulses that induce an electrical current in the inductive coil 154 of the battery charging device 117. This electrical current then charges the battery 115 of the robot 100.

Alternative Implementations

A number of implementations have been described. Nevertheless, it will be understood that various modifications may be made.

While the charging station 200 is described as emitting pulses 60, in some implementations, the charging station 200 can emit signals that are not pulsed. For example, the charging station 200 can emit a continuous magnetic field signal, or could emit magnetic signals that change in amplitude, phase, frequency, or other parameters. Polarization changes of the magnetic signals could also be changed.

While the robot 100 is described as being charged by the charging station 200 through a wireless charging process, in some implementations, the robot 100 is charged by the charging station 200 through direct electrical connection. For example, the robot 100 can include an electrical connector connectable to a corresponding electrical connector on the charging station 200. The charging station 200 can deliver energy to the battery 115 of the robot 100 through the electrical connectors. The magnetic field pulses emitted by the charging station 200 can guide the robot 100 such that the electrical connector on the robot 100 connects with the electrical connector on the charging station 200.

The charging station 200 is described as including the inductive coil 252. In some implementations, the charging station 200 includes multiple inductive coils. For example, the charging station 200 can include a first inductive coil for emitting the magnetic field pulses at the operation 620 to guide the robot 100 to the charging station 200, and a second inductive coil for emitting the magnetic field pulses to charge the battery 115 of the robot 100 at the operation 628.

The electrical characteristics of the electrical signals produced by the magnetic field antennae 152*a*, 152*b* are described as being currents of the electrical signals. In some implementations, the electrical characteristics can be amplitudes (e.g., current or voltage amplitudes), phase, frequencies, or polarizations of the electrical signals.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the robots described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots described herein can be implemented using special purpose logic circuitry, e.g., an FPGA (field programmable gate array) and/or an ASIC (application-specific integrated circuit).

The controllers described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Accordingly, other implementations are within the scope of the claims.

What is claimed is:

1. An autonomous mobile robot comprising:
  a drive system to maneuver the autonomous mobile robot about an environment;
  a first magnetic field antenna system configured to detect a magnetic field pulse emitted by a magnetic field emitter system of a charging station in the environment and to generate a first signal responsive to detecting the magnetic field pulse;
  a second magnetic field antenna system configured to detect the magnetic field pulse and to generate a second signal responsive to detecting the magnetic field pulse, wherein the first magnetic field antenna system and the second magnetic field antenna system are spaced apart from one another in a direction perpendicular to a forward drive direction of the autonomous mobile robot; and
  a controller configured to perform operations comprising reorienting the autonomous mobile robot relative to the charging station based on a difference between the first signal and the second signal.

2. The autonomous mobile robot of claim 1, wherein:
  the operations comprise moving, in a docking operation, the autonomous mobile robot toward the charging station using mapping data until the autonomous mobile robot is within a predetermined distance from the charging station; and
  reorienting the autonomous mobile robot based on the difference between the first signal and the second signal comprises reorienting, in the docking operation, the autonomous mobile robot relative to the charging station in response to the autonomous mobile robot being within the predetermined distance from the charging station and based on the first signal and the second signal.

3. The autonomous mobile robot of claim 2, wherein the operations comprise:
  after reorienting the autonomous mobile robot relative to the charging station in response to the autonomous mobile robot being within the predetermined distance from the charging station, moving the autonomous mobile robot toward the charging station and reorienting the autonomous mobile robot relative to the charging station such that a difference between distances of the first and second magnetic field antenna systems to the magnetic field emitter system decreases.

4. The autonomous mobile robot of claim 1, further comprising a battery configured to be charged at the charging station comprising the magnetic field emitter system,
  wherein the operations comprise initiating a docking operation to move the autonomous mobile robot to the charging station to charge the battery,
  wherein reorienting the autonomous mobile robot comprises reorienting the autonomous mobile robot during the docking operation.

5. The autonomous mobile robot of claim 4, wherein reorienting the autonomous mobile robot comprises reorienting the autonomous mobile robot in response to determining the first magnetic field antenna system is closer to the charging station than the second magnetic field antenna system is to the charging station.

6. The autonomous mobile robot of claim 5, wherein reorienting the autonomous mobile robot in response to determining the first magnetic field antenna system is closer to the charging station than the second magnetic field antenna system is to the charging station comprises reorienting the autonomous mobile robot in response to the first signal and the second signal indicating that the first magnetic field antenna system is closer to the charging station than the second magnetic field antenna system is to the charging station.

7. The autonomous mobile robot of claim 5, wherein determining the first magnetic field antenna system is closer to the charging station than the second magnetic field antenna system is to the charging station comprises:
  determining that a strength of the magnetic field pulse detected at the first magnetic field antenna system is greater than a strength of the magnetic field pulse at the second magnetic field antenna system.

8. The autonomous mobile robot of claim 5, wherein the first signal generated by the first magnetic field antenna system comprises a clipped portion, and the second signal generated by the second magnetic field antenna system comprises a clipped portion, wherein a duration of the clipped portion of the first signal is greater than a duration of the clipped portion of the second signal.

9. The autonomous mobile robot of claim 8, wherein the operations further comprise:
  obtaining a first value by extrapolating a declining portion of the first signal;
  obtaining a second value by extrapolating a declining portion of the second signal; and
  determining that the first signal and the second signal indicate that the first magnetic field antenna system is closer to the charging station than the second magnetic field antenna system is to the charging station based on the first value being greater than the second value.

10. The autonomous mobile robot of claim 4, wherein the battery is configured to be charged by a magnetic field emitted by the magnetic field emitter system of the charging station.

11. The autonomous mobile robot of claim 4, wherein initiating the docking operation to move the autonomous mobile robot to the charging station to charge the battery comprises initiating the docking operation to move the autonomous mobile robot to a charging position in which the autonomous mobile robot is positioned above at least a portion of the magnetic field emitter system of the charging station.

12. The autonomous mobile robot of claim 11, wherein, in the charging position, the autonomous mobile robot is positioned above an inductive coil of the magnetic field emitter system of the charging station.

13. The autonomous mobile robot of claim 4, wherein the magnetic field emitter system is a first magnetic field emitter, and the battery is configured to be charged by a second magnetic field emitter system of the charging station.

14. The autonomous mobile robot of claim 4, wherein the operations further comprise:
  moving the autonomous mobile robot in response to determining that the autonomous mobile robot is misaligned with the charging station as the charging station performs a charging operation to charge the battery of the autonomous mobile robot.

15. The autonomous mobile robot of claim 4, wherein the operations further comprise:
as the charging station performs a charging operation to charge the battery of the autonomous mobile robot, periodically communicating with the charging station to indicate a presence of the autonomous mobile robot at the charging station.

16. The autonomous mobile robot of claim 4, wherein the operations further comprise:
as the charging station performs a charging operation to charge the battery of the autonomous mobile robot, communicating with the charging station to indicate a presence of the autonomous mobile robot at the charging station, wherein communicating with the charging station comprises producing a capacitance change detectable by the charging station.

17. The autonomous mobile robot of claim 1, further comprising a navigation sensor configured to generate mapping data as the autonomous mobile robot moves about the environment,
wherein the operations comprise:
navigating the autonomous mobile robot toward the magnetic field emitter system based on the mapping data, and then
navigating, in response to determining that the autonomous mobile robot is within a distance from the magnetic field emitter system, the autonomous mobile robot based on outputs of the first magnetic field antenna system and outputs of the second magnetic field antenna system.

18. The autonomous mobile robot of claim 1, wherein:
the magnetic field pulse comprises a first magnetic field pulse,
the first magnetic field antenna system is responsive to a second magnetic field pulse to generate a third signal, the second magnetic field pulse emitted by the magnetic field emitter system, and
the second magnetic field antenna system is responsive to the second magnetic field pulse to generate a fourth signal.

19. The autonomous mobile robot of claim 18, wherein:
reorienting the autonomous mobile robot based on the difference between the first signal and the second signal comprises moving the autonomous mobile robot in a first direction in response to the first signal and the second signal indicating that the first magnetic field antenna system is closer to the charging station than the second magnetic field antenna system is to the charging station, the charging station comprising the magnetic field emitter system, and
the operations further comprise moving the autonomous mobile robot in a second direction in response to the third signal and the fourth signal indicating that the second magnetic field antenna system is closer to the charging station than the first magnetic field antenna system is to the charging station.

20. The autonomous mobile robot of claim 1, wherein the first magnetic field antenna system is positioned on a first lateral half of the autonomous mobile robot, and the second magnetic field antenna system is positioned on a second lateral half of the autonomous mobile robot.

21. The autonomous mobile robot of claim 1, wherein the drive system further comprises a first drive wheel and a second drive wheel operable to move the autonomous mobile robot about the environment, wherein the first magnetic field antenna system is adjacent to the first drive wheel, and the second magnetic field antenna system is adjacent to the second drive wheel.

22. The autonomous mobile robot of claim 1, wherein a distance between the first magnetic field antenna system and a rightmost edge of the autonomous mobile robot is no more than 5% to 15% of an overall width of the autonomous mobile robot, and a distance between the second magnetic field antenna system and a leftmost edge of the autonomous mobile robot is no more than 5% to 15% of the overall width of the autonomous mobile robot.

23. The autonomous mobile robot of claim 1, wherein the first magnetic field antenna system comprises a first inductive coil responsive to the magnetic field pulse, and the second magnetic field antenna system comprises a second inductive coil responsive to the magnetic field pulse.

24. A method comprising:
detecting, by a first magnetic field antenna system of an autonomous mobile robot, a magnetic field pulse emitted by a magnetic field emitter system of a charging station in an environment;
generating, by the first magnetic field antenna system of, a first signal in response to detecting the magnetic field pulse;
detecting, by a second magnetic field antenna system of the autonomous mobile robot, the magnetic field pulse, wherein the first magnetic field antenna system and the second magnetic field antenna system are spaced apart from one another in a direction perpendicular to a forward drive direction of the autonomous mobile robot;
generating, by the second magnetic field antenna system, a second signal in response to detecting the magnetic field pulse; and
reorienting the autonomous mobile robot relative to the charging station based on a difference between the first signal and the second signal.

25. The method of claim 24, comprising:
moving, in a docking operation, the autonomous mobile robot toward the charging station until the autonomous mobile robot is within a predetermined distance from the charging station,
wherein reorienting the autonomous mobile robot based on the difference between the first signal and the second signal comprises reorienting, in the docking operation, the autonomous mobile robot relative to the charging station in response to the autonomous mobile robot being within the predetermined distance from the charging station and based on the first signal and the second signal.

26. The method of claim 25, comprising:
after reorienting the autonomous mobile robot relative to the charging station in response to the autonomous mobile robot being within the predetermined distance from the charging station, moving the autonomous mobile robot toward the charging station and reorienting the autonomous mobile robot relative to the charging station such that a difference between distances of the first and second magnetic field antenna systems to the magnetic field emitter system decreases.

27. The method of claim 24, comprising:
initiating a docking operation to move the autonomous mobile robot to the charging station to charge a battery of the autonomous mobile robot,
wherein reorienting the autonomous mobile robot comprises reorienting the autonomous mobile robot during the docking operation.

28. The method of claim 24, wherein reorienting the autonomous mobile robot comprises reorienting the autonomous mobile robot in response to determining the first magnetic field antenna system is closer to the charging station than the second magnetic field antenna system is to the charging station.

* * * * *